(12) United States Patent
Ogawa

(10) Patent No.: US 8,443,043 B2
(45) Date of Patent: May 14, 2013

(54) CONTENT SHARING SYSTEM AND CONTENT SHARING METHOD

(75) Inventor: Wataru Ogawa, Fukuoka (JP)

(73) Assignee: SmartEbook.com Co., Ltd., Fukuoka (JP)

( * ) Notice: Subject to any disclaimer, the term of this patent is extended or adjusted under 35 U.S.C. 154(b) by 0 days.

(21) Appl. No.: 13/394,074

(22) PCT Filed: Apr. 13, 2010

(86) PCT No.: PCT/JP2010/056565
§ 371 (c)(1),
(2), (4) Date: Mar. 16, 2012

(87) PCT Pub. No.: WO2011/092870
PCT Pub. Date: Aug. 4, 2011

(65) Prior Publication Data
US 2012/0311039 A1    Dec. 6, 2012

(30) Foreign Application Priority Data
Jan. 29, 2010  (WO) .................. PCT/JP2010/051223

(51) Int. Cl.
G06F 15/16    (2006.01)
(52) U.S. Cl.
USPC ........................................... 709/204; 726/28
(58) Field of Classification Search ...... 709/204; 726/28
See application file for complete search history.

(56) References Cited

U.S. PATENT DOCUMENTS

| 2002/0129119 | A1  | 9/2002 | Aoki et al. |
| 2005/0091595 | A1* | 4/2005 | Shappell et al. ............ 715/700 |
| 2005/0131953 | A1  | 6/2005 | Sugiyama et al. |
| 2007/0037653 | A1* | 2/2007 | Jolliff et al. .................. 475/83 |
| 2007/0198430 | A1* | 8/2007 | Takahashi et al. ............. 705/59 |
| 2009/0006256 | A1* | 1/2009 | Lazovsky et al. .............. 705/57 |
| 2009/0131172 | A1* | 5/2009 | Karstens ....................... 463/40 |

(Continued)

FOREIGN PATENT DOCUMENTS

| EP | 1 536 358 A1 | 6/2005 |
| JP | 2002-268986 A | 9/2002 |

(Continued)

OTHER PUBLICATIONS

The International Bureau of WIPO, International Preliminary Report on Patentability, mailed in PCT/JP2010/051223 on May 18, 2010; English translation issued on Aug. 7, 2012.

(Continued)

*Primary Examiner* — Thomas Dailey

(57) ABSTRACT

A content sharing system shares contents following a free will of a user through belonging to a plurality of groups. A group stores identification information on each of one or more groups to which respective users belong while being associated with identification information on the user. A file stores a download history of the content via user terminals by respective users while being associated with the identification information on the users. A group determination unit determines a group to which the user accessing via the user terminal. A file determination unit determines whether a content already primarily downloaded by another user belonging to the group determined by the group determination unit exists on the basis of the download history. If the content already primarily downloaded by the another user exists, secondary download to the user terminal accessing the above-mentioned content is permitted.

27 Claims, 17 Drawing Sheets

U.S. PATENT DOCUMENTS

| | | | |
|---|---|---|---|
| 2011/0055901 A1* | 3/2011 | Karaoguz et al. | 726/4 |
| 2011/0055935 A1* | 3/2011 | Karaoguz et al. | 726/29 |
| 2011/0131663 A1* | 6/2011 | Kaikuranta et al. | 726/28 |

FOREIGN PATENT DOCUMENTS

| | | | |
|---|---|---|---|
| JP | 2003-108791 A | 4/2003 | |
| JP | 2004-094677 A | 3/2004 | |
| JP | 2008-186330 A | 8/2008 | |
| WO | WO 2004/072853 A1 | 8/2004 | |

OTHER PUBLICATIONS

The International Bureau of WIPO, International Preliminary Report on Patentability, mailed in PCT/JP2010/056565 on Jul. 6, 2010; English translation issued on Sep. 4, 2012.

* cited by examiner

FIG. 5

| MONTHLY FEE COURSE (YEN) | NUMBER OF GROUPS THAT CAN BE REGISTERED | NUMBER OF AVAILABILITIES FOR CONTENT SECONDARY DOWNLOAD |
|---|---|---|
| 315 | NO LIMIT | 3 TIMES/MONTH |
| 525 | NO LIMIT | 10 TIMES/MONTH |
| 1,050 | NO LIMIT | 30 TIMES/MONTH |
| 2,100 | NO LIMIT | NO LIMIT/MONTH |

FIG. 17

| RESTRICTION REMOVAL CONDITION | CONDITION FOR PRIMARILY DOWNLOADED PARTICULAR CONTENT | CONDITION FOR USER WHO PERFORMS PRIMARY DOWNLOAD | SECONDARY DOWNLOAD ENTITLED USER | SECONDARY DOWNLOAD ENTITLED PERIOD |
|---|---|---|---|---|
| 1 | CONTENT WITH SECONDARY DOWNLOAD RIGHT | GROUP USER WHO PERFORMS PRIMARY DOWNLOAD OF PARTICULAR CONTENT | OUT-OF-GROUP USER | 3 MONTHS |
| 2 | CONTENT WITH SECONDARY DOWNLOAD RIGHT | OUT-OF-GROUP USER WHO PERFORMS PRIMARY DOWNLOAD OF PARTICULAR CONTENT | GROUP USER | 3 MONTHS |
| 3 | — | PARTICULAR USER WHO PERFORMS PRIMARY DOWNLOAD IN PREDETERMINED PERIOD BY MORE THAN OR EQUAL TO PREDETERMINED NUMBER | GROUP USER OR OUT-OF-GROUP USER | 1 HOUR |

CONTENT SHARING SYSTEM AND CONTENT SHARING METHOD

TECHNICAL FIELD

The present invention relates to a content sharing system and a content sharing method for managing, by controlling distribution of contents toward user terminals from a content distributing apparatus for each group composed of a plurality of users, sharing of the respective contents in the group by the users.

BACKGROUND ART

In a content distributing business for distributing a content via a communication network, services that target music and video are already widely spread, but in recent years, and attention on a service targeting an electronic book is enhanced. Also, when entries of existing publishers and the like increase and a large number of quality electronic books are provided together with printed products or as substitutes for printed products, and electronic book market is expected to swiftly expand.

A dedicated-use terminal apparatus for viewing an electronic book or electronic book viewing software (hereinafter, which may be referred to as "electronic book viewer".) is currently available. A user of a terminal apparatus having a communication function installed with the electronic book viewer, which is, for example, a personal computer (PC), a mobile phone device, or a smart phone, can download an electronic book from a so-called electronic book site and enjoy it by the electronic book viewer.

Electronic books that can be downloaded from the electronic book site include computerized print media such as books including a comic and a novel and a photo collection. It should be noted that the electronic books in the present specification are not limited to these and include computerized print media such as a news paper, a magazine, a product catalog, and a free newspaper which are provided from a newspaper company and a publisher.

Incidentally, in a general mode for the content sharing service in conventional various Web services, a user decided whether to belong to a specific field (for example, a network space) or a sharing group or not. The user participating the sharing group passively accepts a situation where an existing user in the field or the group (another member previously belonging to the group) improves and expands the content with regard to the content already shared by him/herself. Also, the user belonging to the sharing group defers expansion and limitation of a sharing range to another group member by way of participation of a new member and withdrawal of an existing member.

On the other hand, a technique of sharing a content with another user in the same space on a network space where users gather is proposed (Patent Literature 1).

CITATION LIST

Patent Literature

Patent Literature 1: Japanese Unexamined Patent Application Publication No. 2003-337776

SUMMARY OF THE INVENTION

Technical Problem

According to the conventional content sharing service, a user belonging to a certain sharing group cannot expand or limit the sharing range of the content at the discretion of the user. For example, in the case of an example of the book, while belonging to various groups, a certain individual can improve and expand the content shared by him/herself by sometimes expanding and sometimes limiting the sharing range of the book at an individual free will, for example, in such a manner that the user mutually circulate comics with friends, borrows a business book recommended by a supervisor at work, and mutually creates a travel plan with a lover while looking at a guide book in the real world. In contrast to this, in the mode of the content sharing service in the existing Web service, the selection of the sharing range and the actively-involved improvement of the shared content at such individual free will are not realized.

In view of the above, the present invention has been made while taking into consideration the above-mentioned issue, and an object thereof is to provide a content sharing system and a content sharing method with which an improvement of a shared content at a free will of a user can be realized through belonging to a plurality of groups.

Solution to Problem

In order to achieve the above-mentioned object, a content sharing system according to the present invention is a content sharing system for managing, by controlling distribution of contents toward user terminals from a content distributing apparatus for each group composed of a plurality of users, sharing of the respective contents in the group, the content sharing system including:

a content distributing unit that distributes content data to the user terminal in accordance with a download request from the respective user terminals connected to the content distributing apparatus via the communication network;

a storage unit that stores a download history of a content via the user terminal by the respective users while being associated with user identification information and also stores identification of each of one or more groups to which the respective users belong while being associated with the user identification information;

a group determination unit that determines a group to which a user accessing via the user terminal belongs; and a sharing control unit that determines whether a content already primarily downloaded by another user belonging to the determined group exists on the basis of the download history, and permits secondary download of the content primarily downloaded by the another user to the accessing user terminal, upon existence of the content.

According to a preferred embodiment of the present invention, the content sharing system is characterized in that:

the primary download is a first download of a content accompanied by a payment of a cost by a user, and the secondary download is a download of a content which is not accompanied by the payment of the cost by the user; and that the primary download and the secondary download include transfer of a content file or stream data from the content sharing apparatus to the user terminal by the content distributing unit.

According to a preferred embodiment of the present invention, the content sharing system is characterized in that:

the storage unit further stores sharing instruction information instructing whether or not the content primarily downloaded by the user him/herself is shared with another user in the group; and that the sharing control unit permits or forbids the secondary download to the user terminal accessing the content primarily downloaded by the another user on the basis of the sharing instruction information.

According to a preferred embodiment of the present invention, the content sharing system is characterized in that:

the storage unit further stores upper limit instruction information instructing an upper limit conduct number in a predetermined period with regard to the number of secondary download availabilities for the content primarily downloaded by the another user;

wherein the download history further includes a secondary download conduct number in the predetermined period associated with the user;

wherein the content sharing system further includes a utilization upper limit determination unit that determines whether the number of secondary download within the predetermined period is smaller than the upper limit conduct number on the basis of the upper limit instruction information and the download history; and wherein the sharing control unit permits the secondary download to the accessing user terminal, upon the secondary download conduct number in the predetermined period being smaller than the upper limit conduct number.

According to a preferred embodiment of the present invention, the content sharing system is characterized in that:

the content distributing unit generates display data which is composed of a first display part showing meta data on a primarily downloaded content and/or a second display part showing meta data on a content where secondary download can be performed and which is transmitted to the user terminal.

According to another embodiment of the present invention, the content sharing system further comprises:

a particular content determination unit that determines whether a user belonging to a particular group ("group user") selects a particular content and performs primary download;

wherein the storage unit further stores information related to a first restriction removal condition in a case where a third user who does not belong to the particular group ("out-of-group user") is permitted to perform secondary download via the user terminal of the particular content primarily downloaded by the group user and stores, in response to the primary download of the particular content by the group user, identification information on the group user while being associated with identification information on the out-of-group user; and wherein the sharing control unit further determines whether or not the first restriction removal condition is satisfied in accordance with an access by the out-of-group user, and permits secondary download to the accessing user terminal of the out-of-group user with regard to the particular content primarily downloaded by the group user, upon the condition being satisfied.

According to still another embodiment of the present invention, the content sharing system further comprises:

a particular content determination unit that determines whether a third user who does not belong to a particular group ("out-of-group user") selects a particular content and performs primary download;

wherein the storage unit further stores information related to a second restriction removal condition in a case where a user belonging to the particular group ("group user") is permitted to perform secondary download via the user terminal of the particular content primarily downloaded by the out-of-group user and stores, in response to the primary download of the particular content by the out-of-group user, identification information on the out-of-group user while being associated with identification information on the group user; and wherein the sharing control unit further determines whether or not the second restriction removal condition is satisfied in accordance with an access by the group user, and permits secondary download to the accessing user terminal of the group user with regard to the particular content primarily downloaded by the out-of-group user, upon the condition being satisfied.

According to still another embodiment of the present invention, the content sharing system is characterized in that:

the storage unit further stores information related to a third restriction removal condition in a case where a user belonging to a particular group ("group user") or a third user who does not belong to the particular group ("out-of-group user") is permitted to perform secondary download via the user terminal of a content primarily downloaded by a particular user; and wherein the sharing control unit further determines whether or not the third restriction removal condition is satisfied in accordance with an access by the group user or the out-of-group user, and permits secondary download to the accessing user terminal of the group user or out-of-group user with regard to the particular content primarily downloaded by the particular user, upon the condition being satisfied.

Advantageous Effects of Invention

According to the present invention, the group to which the user accessing via the user terminal belongs is determined, whether a content already primarily downloaded by another use belonging to the determined group exists is determined on the basis of the download history, and if the content already primarily downloaded by the another user exists, the secondary download of the content already primarily downloaded by the another user to the accessing user terminal is permitted. Therefore, for example, in a case where the present invention is applied to an electronic book providing site, with regard to the electronic book data (content) that is purchased by the respective users and can be viewed by oneself, it is possible to assign an entitlement of downloading the electronic book data purchased by the user from the distribution server to another user who is a member in the group to which the user belongs.

Also, according to a preferred embodiment of the present invention, the primary download can be set as a first download of a content accompanied by a payment of a cost (for example, a service usage fee, a content purchase unit price, points having a convertibility to the above-mentioned usage fee or purchase unit price, and the like) by a user, and the secondary download can be set as a download of a content which is not accompanied by the payment of the cost by the user. Therefore, for example, in the electronic book providing site to which the present invention is applied, the user can share the viewing entitlement of the electronic book data purchased by him/herself with all the members in a plurality of groups to which the user him/herself belongs for free, and on the other hand, similarly as in the real world, it is possible to view the book purchased by another user belonging to the respective groups in accordance with purposes for free.

Furthermore, according to a preferred embodiment of the present invention, the sharing instruction information instructing whether or not the content primarily downloaded by the user him/herself is shared with another user in the group is stored, and on the basis of the sharing instruction information, the secondary download of the content already primarily downloaded by the another user to the accessing user terminal is permitted or forbidden. Therefore, the user him/herself can realize the improvement and expansion of the shared content while following the free will of the user.

As described above, according to the present invention, in the distribution or subscription service of the content such as the electronic book, the user can belong to a plurality of sharing groups. According to such grouping, it is possible to adopt a configuration in which the user actively creates a new group, or brings in another user to the created group, or participates in another group created by another user, and also brings in a new user to the above-mentioned other group. Therefore, the user can not only improve the content shared in the group to which the user him/herself belongs while following his/her will but also select the range of the content to be shared with other use so by him/herself and also actively improve and expand his/her content to be shared.

The above-mentioned objects of the present invention and other objects and advantages are more clearly understood through the following description of embodiments. Nonetheless, the embodiments that will be described below are exemplifications, and the present invention is not limited to these.

DESCRIPTION OF DRAWINGS

FIG. 5 is a chart illustrating an example of a correspondence between usage fee courses for a user and the number of availabilities for the secondary download of a content.

FIG. 17 is a chart exemplifying information related to a restriction removal condition.

REFERENCE SIGNS LIST

1 Content sharing system
11 Content distributing apparatus
12A, 12B, 12C User terminal
13 Communication network

DESCRIPTION OF EMBODIMENTS

Hereinafter, preferred embodiments of the present invention will be described in detail on the basis of the drawings. It should be noted that in the following explanation, a description will be given of an example in which the present invention is applied to a content distributing system where user terminals which are mobile telephone devices or smart phones installed with an electronic book viewer are connected via a communication network to a content distributing apparatus provided with a Web server for providing electronic book data toward the above-mentioned user terminals.

Figure 1:
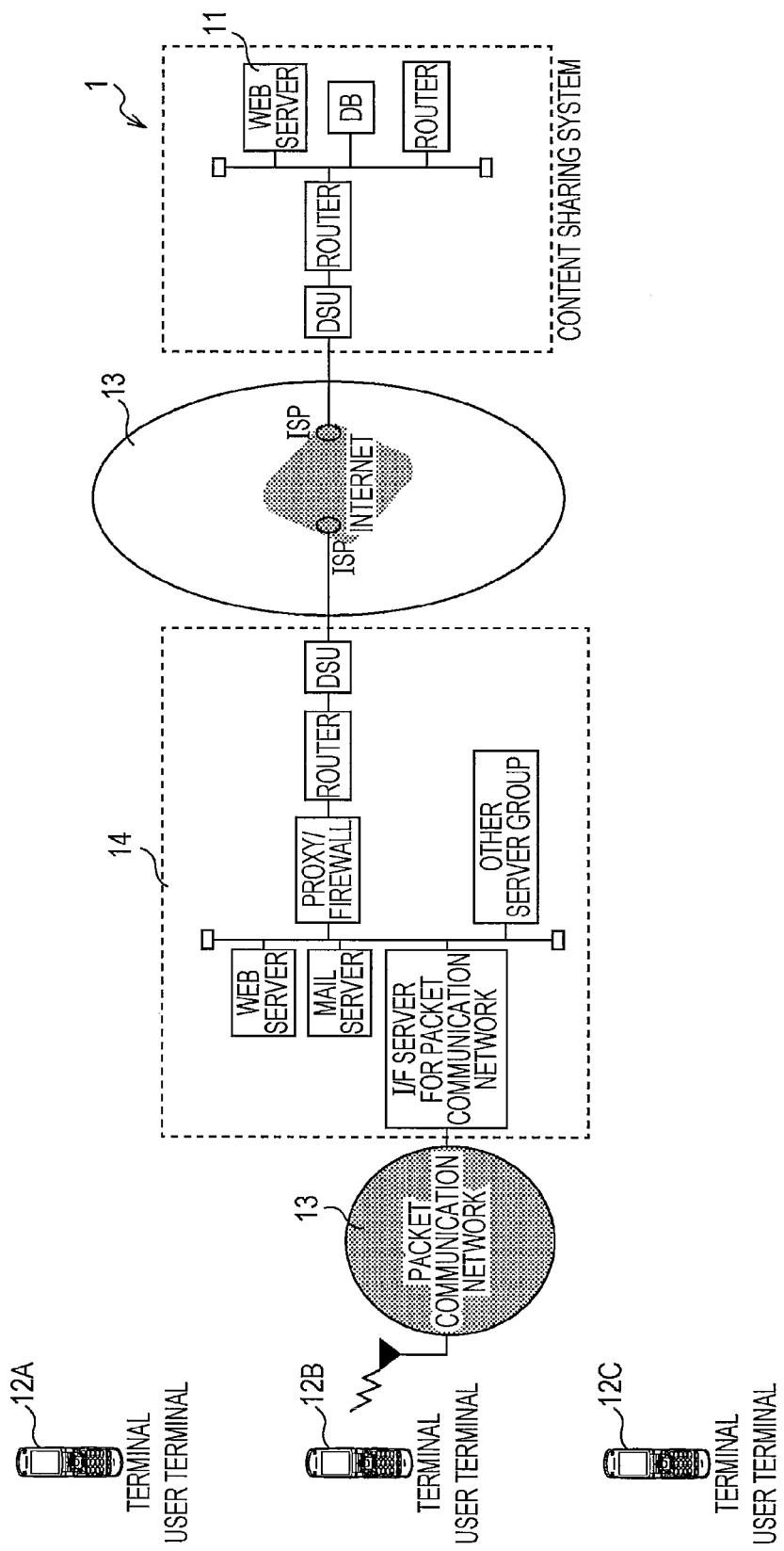
FIG. 1 illustrates a schematic configuration of a content sharing system 1 according to an embodiment to which the present invention is applied.

FIG. 1 illustrates a schematic configuration of a content sharing system 1 according to an embodiment to which the present invention is applied. As illustrated in FIG. 1, the content sharing system 1 includes a content distributing apparatus 11 composed of the Web server. User terminals 12A 12B, and 12C are connected to the content distributing apparatus 11 via a communication network 13.

In accordance with download requests from the respective user terminals 12A, 12B, and 12C connected to the apparatus 11 via the communication network 13, the content distributing apparatus 11 distributes content data toward the user terminals 12A, 12B, and 12C.

As described above, the user terminals 12A, 12B, and 12C are the mobile telephone devices or the smart phones installed with the electronic book viewer and are connected via a packet communication network and a service center 14 that can provide an internet connection service of a mobile phone service provider (hereinafter which will be referred to as "carrier".) to the internet. In FIG. 1, for convenience of the description, only three user terminals 12A, 12B, and 12C are illustrated, but take into account that in actuality, four or more user terminals are connected to the communication network for utilizing the sharing service of the present invention. It should be noted that types of the user terminals, types of the electronic book viewer, and formats of the electronic book are not particularly limited unless departing from the nature of the present invention.

The user terminals 12A, 12B, and 12C and also each mounted with a Web browser with which Web pages can be browsed and can display various Web page on a display unit provided to the user terminal with a function of above-mentioned Web browser. The Web pages displayed by the user terminals 12A, 12B, and 12C can be files described in markup languages such as HTML (HyperText Markup Language), XML (eXtensible Markup Language), CompactHTML, DHTML (Dynamic HTML), WML (Wireless Markup Language), and HDML (Handheld Device Markup Language) and languages obtained by extending these but not limited to those. It should be noted that the above-mentioned various specifications are merely illustrated as examples, and the applicable scope of the present invention of course also includes ones in conformity to specifications other than the above and specifications obtained by extending the above-mentioned specifications at present and in the future.

By operating input units provided to the user terminals 12A, 12B and 12C and pressing various buttons on the electronic book viewer, the user can shift pages of a displayed book or display various menus for execution. Also, by operating the input units provided to the user terminals 12A, 12B, and 12C, the user scrolls the Web page and presses the various buttons to execute various requests and commands and also can input characters, symbols, numbers, and other information in various input boxes.

It should be noted that the content distributing apparatus 11 includes database (DB), a router, and a digital service unit (DSU) other than the Web server. Among them, the Web server can include a CPU, a storage apparatus such as a ROM or a hard disk, a RAM, an I/F unit such as a USB (Universal Serial Bus), a communication control unit, an input device such as a key board or a mouse, and a display unit. The CPU provided to the Web server reads out a program stored in the storage apparatus to be expanded into a work area that the RAM has for execution to control the respective units of the I/F unit, the communication control unit, the input device, and the display unit.

The communication network 13 mentioned above may be configured by including various communications lines such as an exclusive line, a public phone line, and a satellite communications line or various servers that are not illustrated, and a specific mode thereof is not particularly limited. Also, a configuration may be adopted that an ISP (Internet Service Provider) or an NSP (Network Service Provider) intermediate between the content distributing apparatus 11, the service center 14 of the carrier and the communication network 13.

Figure 2:
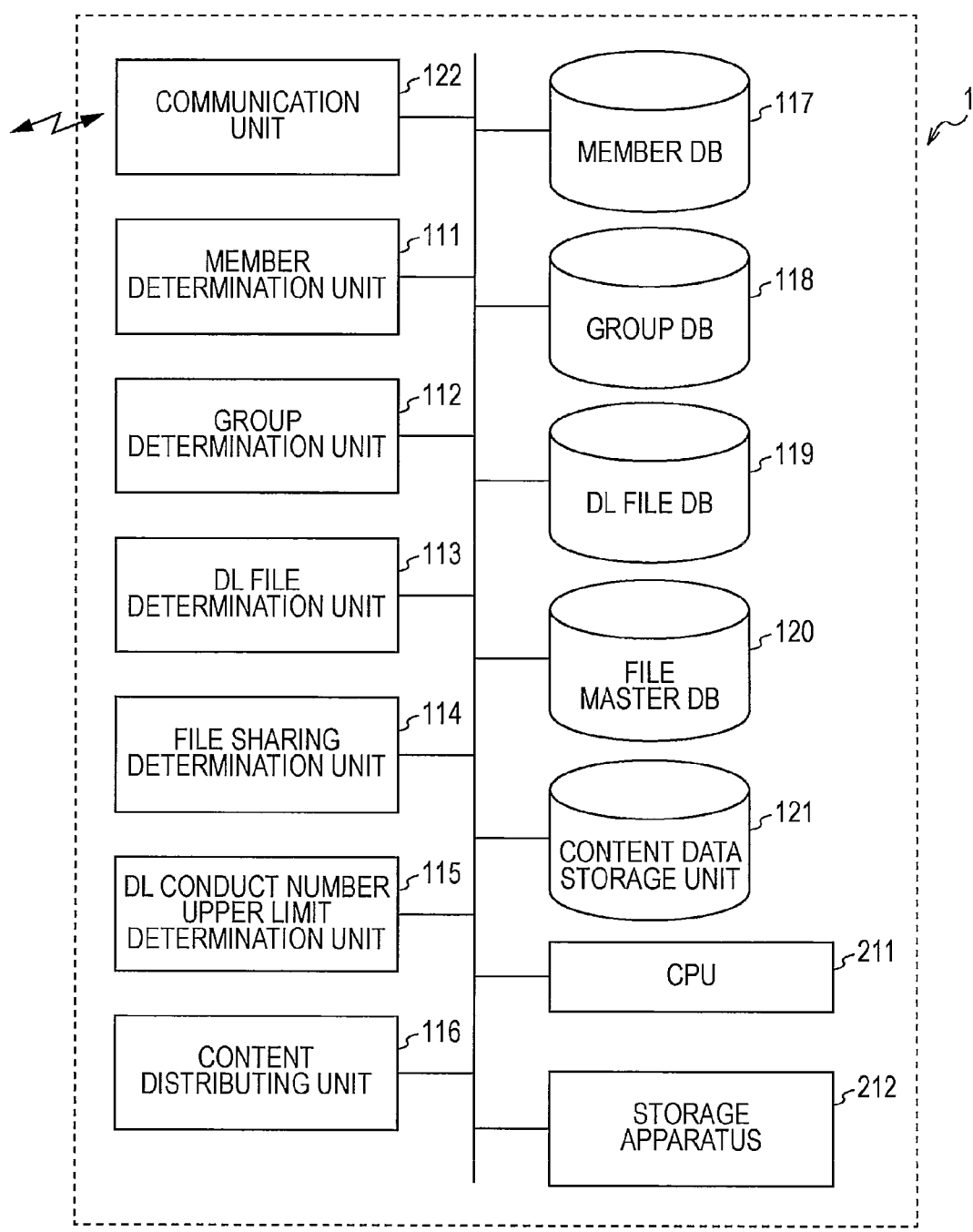
FIG. 2 is a block diagram illustrating a functional configuration of the content sharing system 1 according to embodiment of the present invention.

FIG. 2 is a block diagram illustrating a functional configuration of the content sharing system 1. Configuration units of the content distributing apparatus 11 composed of the Web server illustrated in FIG. 1 are incorporated in a functional configuration of the content sharing system 1 illustrated in FIG. 2. Therefore, in the following explanation, no description distinguishing the content distributing apparatus 11 will be given.

As illustrated in FIG. 2, the content sharing system 1 is provided with a member determination unit 111, a group determination unit 112, a DL file determination unit 113, a file sharing determination unit 114, a DL conduct number upper limit determination unit 115, a content distributing unit 116, a member DB 117, a group DB 118, a DL file DB 119, a file master DB 120, a content data storage unit 121, and a communication unit 122, and the respective units are mutually connected via a bus (a system bus, a USB, or the like).

The content sharing system 1 is a single computer or a computer group and includes a CPU 211 and a storage apparatus 212. The storage apparatus 212, for example, the hard disk (HDD) or the memory (RAM) stores an OS (Operating System) and a program for causing a computer to execute a content distributing processing (hereinafter, which may be referred to as "distributing program" is some cases) and a program for causing the computer to execute a content sharing processing inherent in the present invention (hereinafter, which may be referred to as "sharing program" in some cases), and while these programs are executed, operations of the respective units from the member determination unit 111 to the content distributing unit 116, from the member DB 117 to the content data storage unit 121, and communication unit 122 described above are controlled. It should be noted that member DB 117 and the content data storage unit 121 may be an independent DB server or data store connected to the content sharing system 1.

Next, the respective union illustrated in FIG. 2 will be described.

The determination unit 111 performs a member authentication for users accessing the sharing service via the user terminals 12A, 12B, and 12C.

The group determination unit 112 determines a group to which the user accessing via the user terminals 12A, 12B, and 12C belongs. Also, the group unit 112 accepts a new group creation application that will be described below from the user terminals 12A, 12B, and 12C to perform a processing approving it and accepts an existing group participation application that will be described below from the user terminals 12A, 12B, and 12C to perform a processing for approving it, and the like.

The DL file determination unit 113 determines whether a file content primarily downloaded by the user him/herself accessing via the user terminals 12A, 12B, and 12C exists. Also, the DL file determination unit 113 determines whether content already primarily downloaded by another user belonging to the same group as the user exists on the basis of the download history stored in a DL file DB 119 that will be described below.

The file sharing determination unit 114 determines whether the subject file is a shared file on the system (for example, whether it is a file of a content where sharing is prohibited on the system). Also, the DL file determination unit 113 determines whether the content already primarily downloaded by another user belonging to the same group as the user exists on the basis of the download history stored in the DL file DB 119 that will be described below.

The DL conduct number upper limit determination unit 115 determines whether the number of secondary download within the predetermined period is smaller than the upper limit conduct number on the basis of upper limit instruction information that will be described below and a download history that will also be described below.

Figure 8:
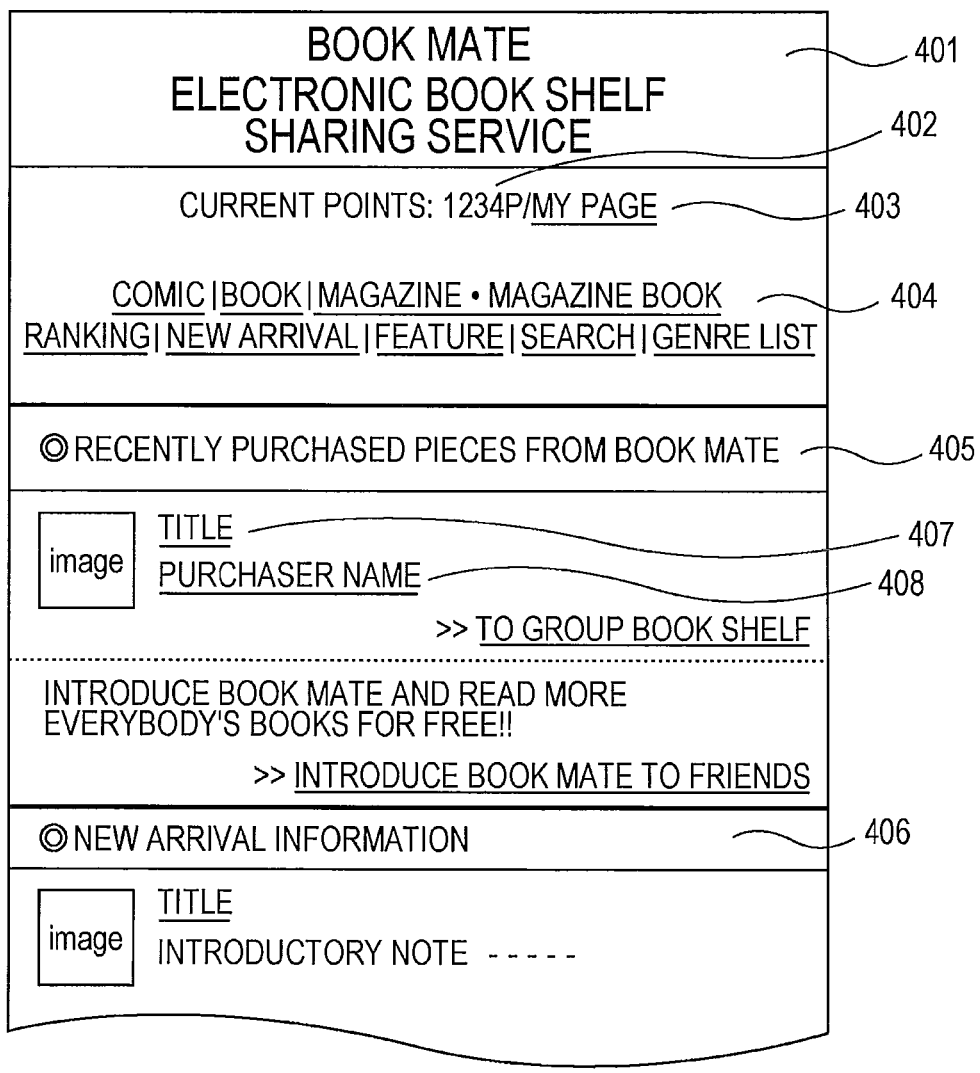
FIG. 8 illustrates an example of a TOP page screen for a sharing service in an electronic book providing site in where the present invention is applied.

In accordance with the accesses from the respective user terminals 12A, 12B, and 12C connected to the content distributing apparatus 11 via the communication network 13 and also various commands transmitted through operations by the users in the user terminals 12A, 12B, and 12C, for example, the content distributing unit 116 generates data on various Web pages related to the content sharing service as illustrated in screen examples in FIG. 8 and subsequent figures to be described below.

Also, in accordance with the download requests from the respective user terminals and 12A, 12B, and 12C, the content distributing unit 116 reads out the content data from the content data storage unit 121 to be distributed through the communication unit 122 that will also be described below toward the user terminals 12A, 12B, and 12C. Such distribution of the content data can be performed by a transfer of a content file or stream data to the user terminals 12A, 12B, and 12C but is not limited to this.

The member DB 117 stores identification information (UID) of users who are paying members for the content sharing service. Also, the member DB 117 stores the upper limit instruction information an upper limit conduct number in a predetermined period (for example, every month) with regard to the number of secondary download availabilities for the content already primarily downloaded by the another user.

The group DB 118 stores each piece of the identification information (GID) of one or more groups to which the user belongs while being associated with the user identification information (UID). According to the present embodiment, a configuration is adopted that the group DB 118 can associate maximum five pieces of user identification information with the identification information (GID) of the one group. That is, the upper limit of the members that can belong to the respective groups is five people. It should be noted that it is arbitrarily set how many are the limit of the members, and it is not limited to five people.

The DL file DB 119 stores the download history of the content via the terminals by the respective users while being associated with the user identification information (UID) .Also, the DL file DB 119 stores sharing instruction information instructing whether or not the content primarily downloaded by the user him/herself should be shared by another user in the group.

The file master DB 120 particularly stores identification information indicating whether or not the film of the content is the shared file on the system (for example, whether or not it is a file of a content where sharing prohibited on the system) while being associated with the identification information of the content.

The content data storage unit 121 stores the content data (material data) provided in the content sharing service. It should be noted that formats for the content data include various formats such as Adobe PDF, Adobe eBook, XMDF, Broad Band ebook, .book, ePub, AZW, TXT, and HTML but are not limited to those. It should be noted that the above-mentioned various formats are merely illustrated as examples, and the applicable scope of the present invention of course also includes similar ones obtained through development and improvement at present and in the future.

On the basis of various information transmitted in accordance with the accesses via the user terminals 12A, 12B, and 12C and the user operations in the user terminals 12A, 12B, and 12C, the communication unit 122 receives the input various commands (for example, a content download request) from the user terminals 12A, 12B, and 12C. Also, the communications unit 122 transmits the data on various Web pages generated by the content distributing unit 116 to the user terminals 12A, 12B, and 12C.

Next, with reference to FIG. 3, FIG. 4, FIG. 5, FIG. 6, and FIG. 7, an operation of the content sharing system 1 will be described.

Figure 3:
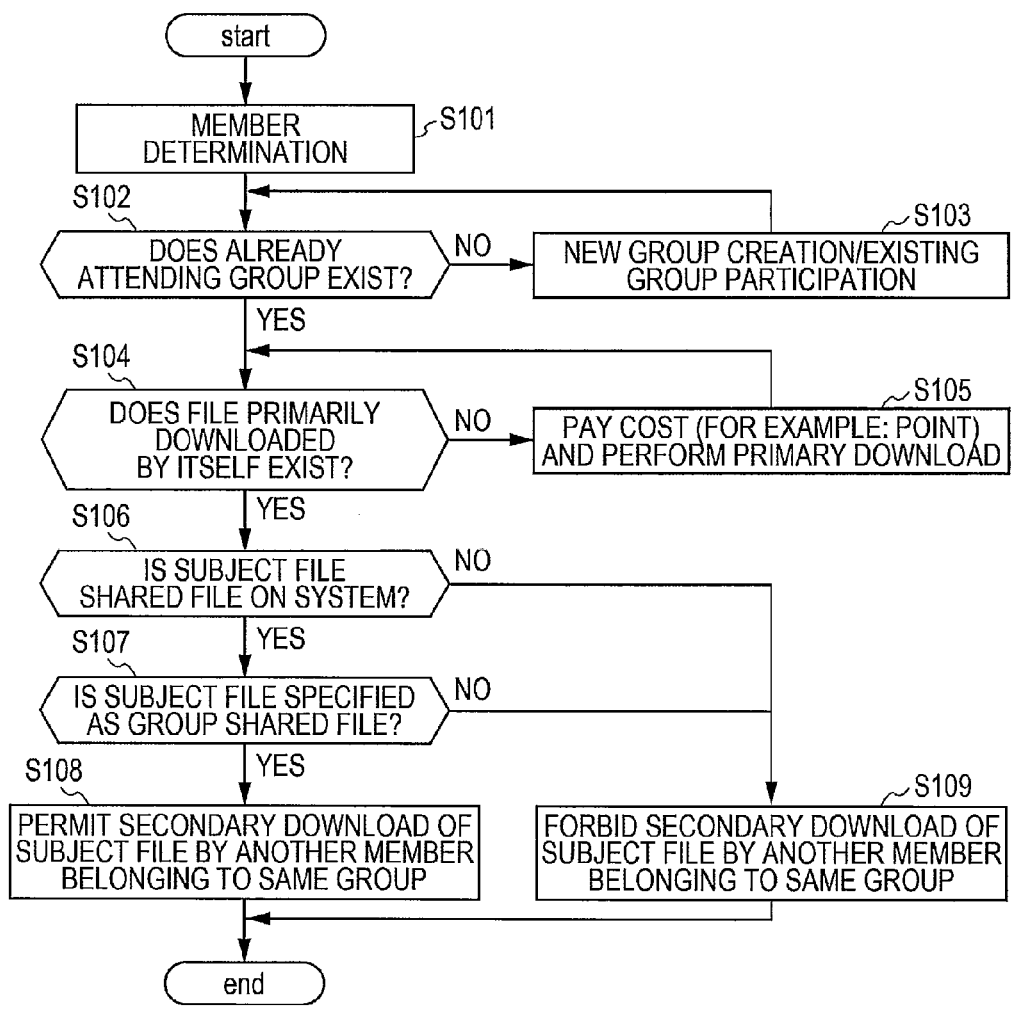
FIG. 3 is a flow chart illustrating an example, of a flow of a processing for permitting secondary download of a subject file by another member in the same group among operations by the content sharing system 1 according to the embodiment of the present invention.

FIG. 3 is a flow chart illustrating an example of a flow of a processing for permitting secondary download of a subject file by another member in the same group among operations.

With reference to FIG. 3, first, in step S101, the member determination unit 111 performs the member authentication for the users accessing the sharing service via the user terminals 12A, 12B, and 12C. That is, identification information unique to the user (irrespective of identification information inherent to the user terminal or identification information obtained from the carrier used by the user or an external site) received by the communication unit 122 in accordance with the accesses via the user terminals 12A, 12B, and 12C is collated with the user identification information (UID) stored in the member DB 117 to authenticate whether to be a paying member of the sharing service.

Next, in step S102, the group determination unit 112 refers to the group DB 118 to determine whether a group where the user who is the paying member has already belonged exists. This is because in order to share a content, one or more groups to which the user belongs are necessary. In a case where no attending group exists, it proceeds to a new group creation/existing group participation processing in step S103 (see FIG. 4) and returns to step S102. In a case where the group to which the user belongs exists, it proceeds to the next stop S104.

In step S104, the DL file determination unit 113 refers to the DL file DB 119 to determine whether a content file primarily downloaded by the user him/herself exists. According to the present embodiment, the primary download refers to a first download of a content accompanied by a payment of a cost by a user (for example, the service usage fee, the content purchase unit price, points having a convertibility to the above-mentioned usage fee or purchase unit price, and the like). Also, the secondary download refers to a download a content already primarily downloaded by another user belonging to the group which is not accompanied by a payment of a cost by the user.

In a case where the content file primarily downloaded by the user him/herself does not exist, it proceeds to step S105, and the cost is paid to request a processing for performing the primary download. When the processing for the primary download is executed via the user terminals 12A, 12B, and 12C, the download history of the content is stored in the DL file DB 119, and it returns to the above-mentioned step S104.

In a case where the content file primarily downloaded by the user him/herself exists, it proceeds to step S106.

In step S106, the file sharing determination unit 114 refers to the file master DB 120 and with regard to the file primarily downloaded by the user (subject file), determines whether the subject file is a shared file on the system. To be more specific, on the basis of the identification information stored in the file master DB 120 indicating whether or not the file of the content is the shared file on the system (for example, whether or not it is a file of a content where sharing is prohibited on the system), in a case where it is determined that the sharing of the subject file is not prohibited on the system, it proceeds to the next step S107, and on the other hand, in a case where it is determined that it is prohibited, it proceeds to step S109, and the secondary download of the subject file by another user belonging to the same group (another member in the same group) is forbidden.

In step S107, the file sharing determination unit 114 refers to the DL file DB 119 and with regard to the file primarily downloaded by the user (subject file), determines whether the subject file is a file specified as group sharing by the user for each group. To be more specific on the basis of the sharing instruction information stored in the DL file DB 119 instructing whether or not the content primarily downloaded by the user him/herself is shared with another user in the group, in a case where it is determined that the subject file is shared in the group, it proceeds to the next step S108, and the secondary download of the subject file by another user belonging to the same group, (another number in the same group) is permitted. Meanwhile, in a case where it is determined that the subject file is not shared in the group, it proceeds to step S109, and the secondary download of the subject file is forbidden.

As described above, with regard to the file primarily downloaded by the user (subject file), when the determination is made as to whether the secondary download permitted or forbidden, on the user terminals of the another user, meta data of the subject file where the secondary download is permitted is displayed, but meta data of the subject file where the secondary download is not permitted is not displayed.

Figure 4:
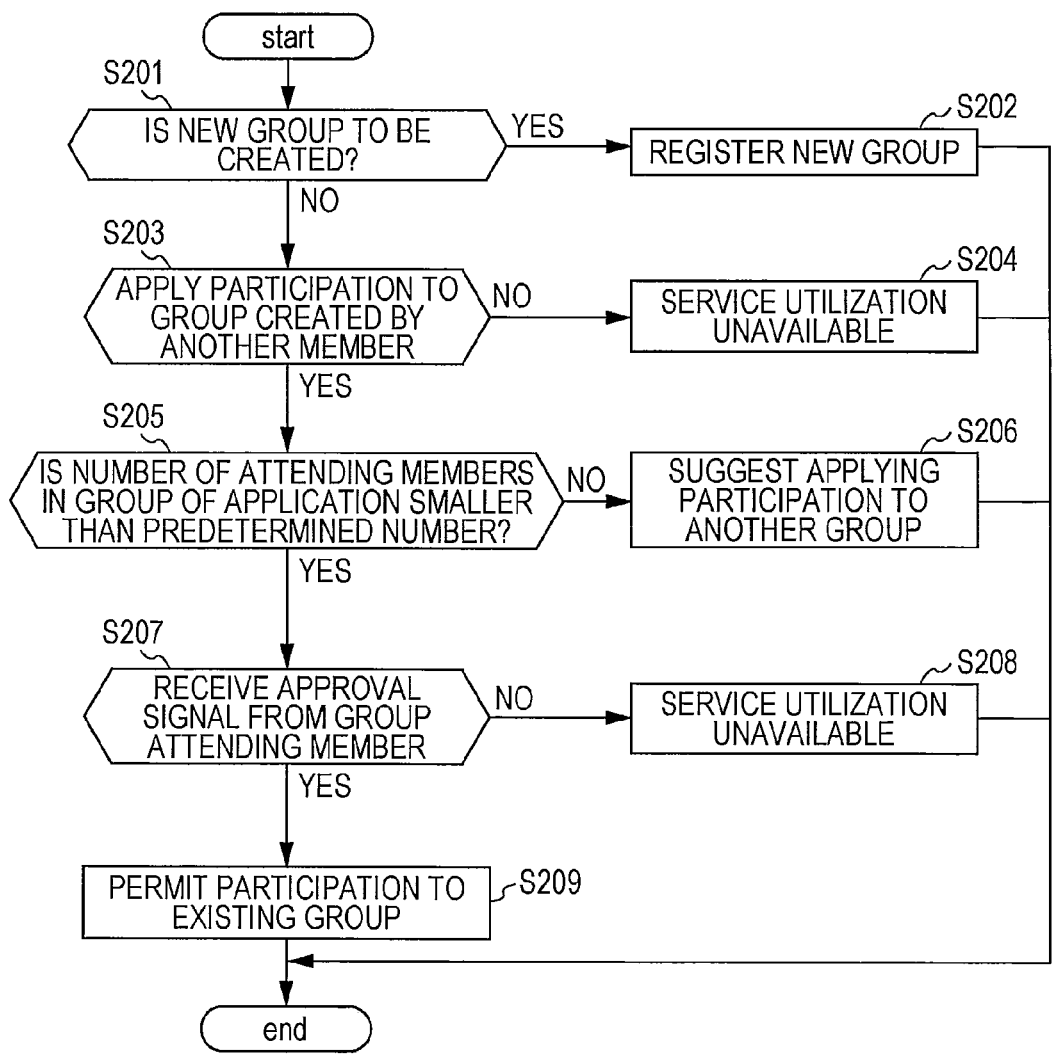
FIG. 4 is a flow chart illustrating an example of a flow of a new group creation/existing group participation processing among the operations by the content sharing system 1 according to the embodiment of the present invention.

Next, with reference to FIG. 4 an example of a flow of a new group creation/existing group participation processing in step S101 of FIG. 3 will be described.

In step S201, it is determined whether a new group is to be created. In a case where an instruction of creating the new group is input by the operations by the users via the user terminals 12A, 12B, and 12C, a new group registration processing in step S202 is executed. This registration processing includes a processing of storing while associating identification information or a new group (GID) with the user identification information (UID) in the group DB 118. At the end of the new group registration processing, the present processing is ended.

In the next step S203, instead of the creation of the new group, it is determined whether a participation application is made to a group created by another user (member). In a case where an instruction for the participation application is not made, it proceeds to step S204, where a notification indicating service unavailability because of the absence of the attending group is transmitted to the user, and the processing is ended. In a case where the instruction for the participation application is input, it proceeds to the next step S205.

In step S205, it is determined whether the number of attending members in the group where the participation application is made is smaller than a predetermined number (below an enrollment limit). As described above, according to the present embodiment, a configuration is adopted that the group DB 118 can associate maximum five pieces of user identification information (UID) with the identification information (GID) of the one group. Therefore, it is possible to execute such determination by referring to the group DB 118. In a case where the number of attending members is the predetermined number, as the user cannot participate into the group, it proceeds to step S206, and a notification suggesting a participation application to another group is transmitted to the user, and the processing is ended. In a case where the number of attending members is smaller than the predetermined number, it proceeds to the next step S207.

In step S207, it is determined whether an application authorization signal is received from another user in the group where the participation application is made (group attending member). That is, according to the present embodiment, as a condition for permitting the participation to the existing group on the system, an application authorization by the group attending member is requested. In a case where the authorization signal is not received, for example, for a certain period, it proceeds to step S208, where a notification indicating service unavailability because of the participation disapproval is transmitted to the user, and the processing is ended. In the reverse case, it proceeds to the next step S209, and the participation to the existing group is permitted. With regard to the above-mentioned processing, the group determination unit 112 may execute the all and may also allow another component, for example, the member determination unit 111 to partially execute.

FIG. 5 is a chart illustrating an example of a correspondence between usage fee courses for a user and the number of availabilities for the secondary download of a content according to the present embodiment. According to the present embodiment, for the paying member service, in association with the fee courses utilized by the user, the number of availabilities for the secondary download of the content is set as illustrated. By obtaining information on a latest usage fee course of the user, the member DB 117 updates a utilization upper limit conduct number per month corresponding to a use upper limit the number of availabilities for the secondary download on a right column (upper limit instruction information) to be stored while being associated with the user identification information (UID).

Figure 6:
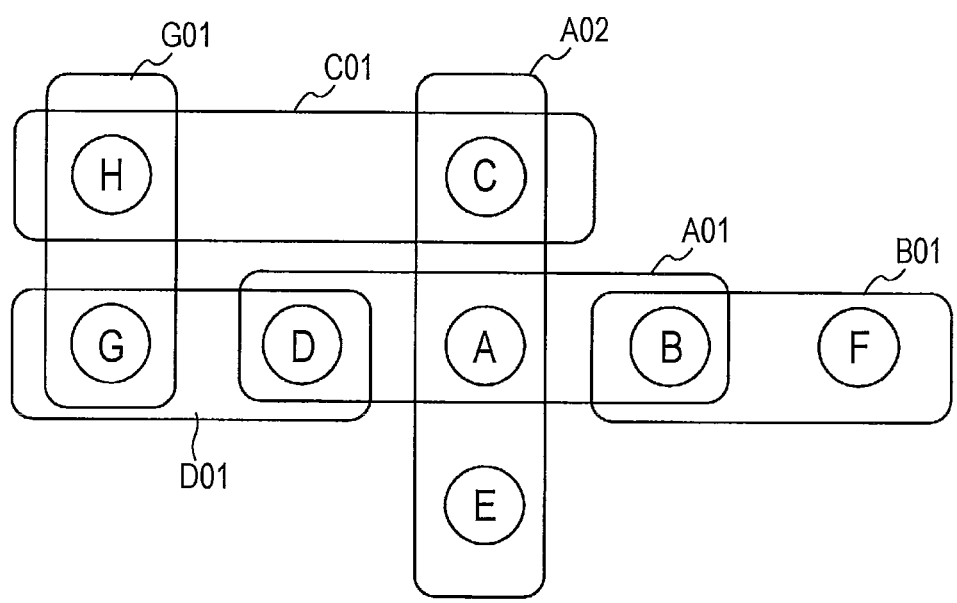
FIG. 6 is a correlation diagram illustrating an example of a relation between groups and users belonging thereto in a case where a plurality of users utilize a content sharing service provided by the content sharing system according to the embodiment of the present invention.

FIG. 6 is a correlation diagram illustrating an example of a relation between groups and users belonging thereto in a case where a plurality of user utilize a content sharing service provided by the content sharing system. As apparent from FIG. 6, it is understood that each of a user A to a user H belongs to one or two groups among groups A01 to G01. According to the present invention, the distribution of the content from the content distributing apparatus toward the user terminals is controlled for each group composed of a plurality of users, and it is possible to manage the sharing of the respective contents in the group.

Figure 7:
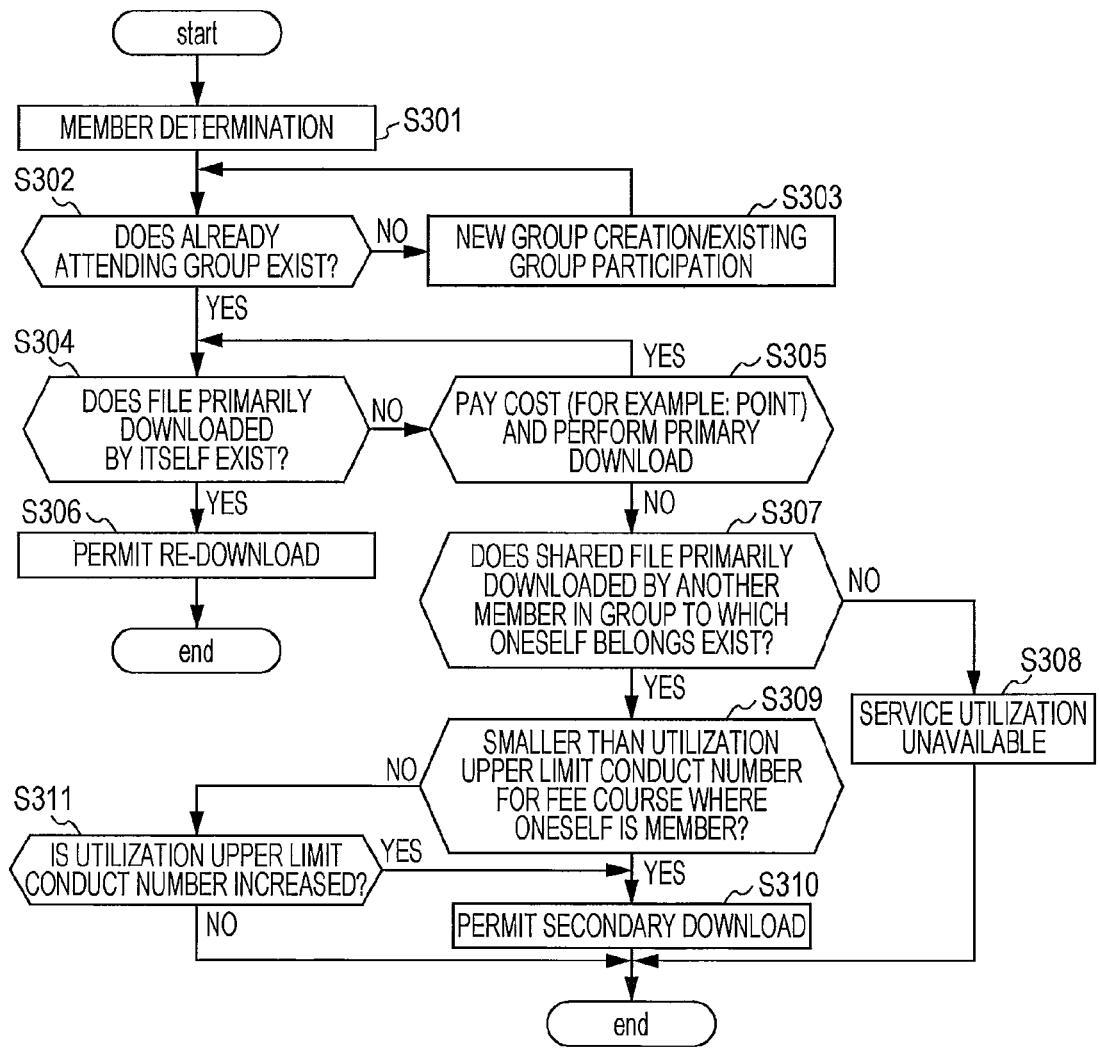
FIG. 7 is a flow chart illustrating an example of a flow of a processing for permitting an accessing user terminal to perform secondary download of a content primarily downloaded by another user among the operations by the content sharing system 1 according to the embodiment of the present invention.

Next, with reference to FIG. 7, an example of a flow of a processing for permitting an accessing user terminal to perform secondary download of a content primarily downloaded by another user will be described.

A member determination step in step S301, a group determination step in step S302, a new group creation/existing group participation processing step in step S303, and a determination step in step S304 are respectively similar to the operation/processings in step S101, step S102, step S103, and step S104 described with reference to FIG. 3 and FIG. 4, and a detailed description herein will be omitted.

In step S304, in a case where the content file primarily downloaded by the user him/herself exists, it proceeds to step S306, where the re-download is performed with respect to the content download request by the operation of the user via the user terminals 12A, 12B, and 12C. This is because it is the primarily downloaded content while the user him/herself pays the cost.

On the other hand, in step S305, the cost is paid and the processing of performing the primary download is requested as in the case in step S105. Herein, in a case where the primary download is not executed via the user terminals 12A, 12B, and 12C, it proceeds to the next step S307.

In step S307, the DL file determination unit 113 refers to the DL file DB 119 to determine whether a shared file content primarily downloaded by another user in the group to which oneself belongs (another member) exists. In a case where such a file does not exist, it proceeds to step S308, and a notification indicating service unavailability because of the absence of the utilizable file is transmitted to the user to end the processing. In a case where such a file exists, it proceeds to step S309.

In step S309, the DL conduct number upper limit determination unit 115 refers to the member DB 117 and the DL file DB 119 to determine whether the secondary download conduct number of this month by the user is smaller than the utilization upper limit conduct number per month. In the case of being smaller than the utilization upper limit conduct number, it proceeds to step S310, and another user belonging to the same group permits the secondary download of the primarily downloaded. Meanwhile, in a case where the secondary download conduct number of this month by the user reaches the utilization upper limit conduct number, with respect to the user, a notification suggesting increasing the utilization upper limit conduct number (for example, a change to a course with a still larger utilization upper limit conduct number or the like) is transmitted to the user, and in a case where the user accordingly increases the utilization upper limit conduct number, as the condition satisfies the case of being smaller than the utilization upper limit conduct number, it proceeds to step S310, and the secondary download is permitted. In a case where the utilization upper limit conduct number is not increased, the processing is ended.

It should be noted that when the user permitted the secondary download executes the above-mentioned secondary download, the record is of course stored in the DL file DB 119.

Next, the reference to FIG. 8, FIG. 9, FIG. 10, FIG. 11, FIG. 12, FIG. 13, FIG. 14, and FIG. 15, a description will be given of configuration examples of various pages for a sharing service in an electronic book providing site in a case where the present invention is applied. These pieces of display data on these page screens are generated by the content distributing unit 116 and transmitted through the communication unit 122 toward the user terminals 12A, 12B, and 12C.

FIG. 8 illustrates an example of a TOP page screen for the sharing service in the electronic book providing site in a case where the present invention is applied. A TOP page is composed of, following a page title 401, a current point value 402, a link 403 to a menu page illustrated in FIG. 9, a general menu 404, a display part 405 showing meta information on a content where the secondary download can be performed (to be more specific, an electronic book title 407 and a purchaser 408), and a general information display part 406.

Figure 9:
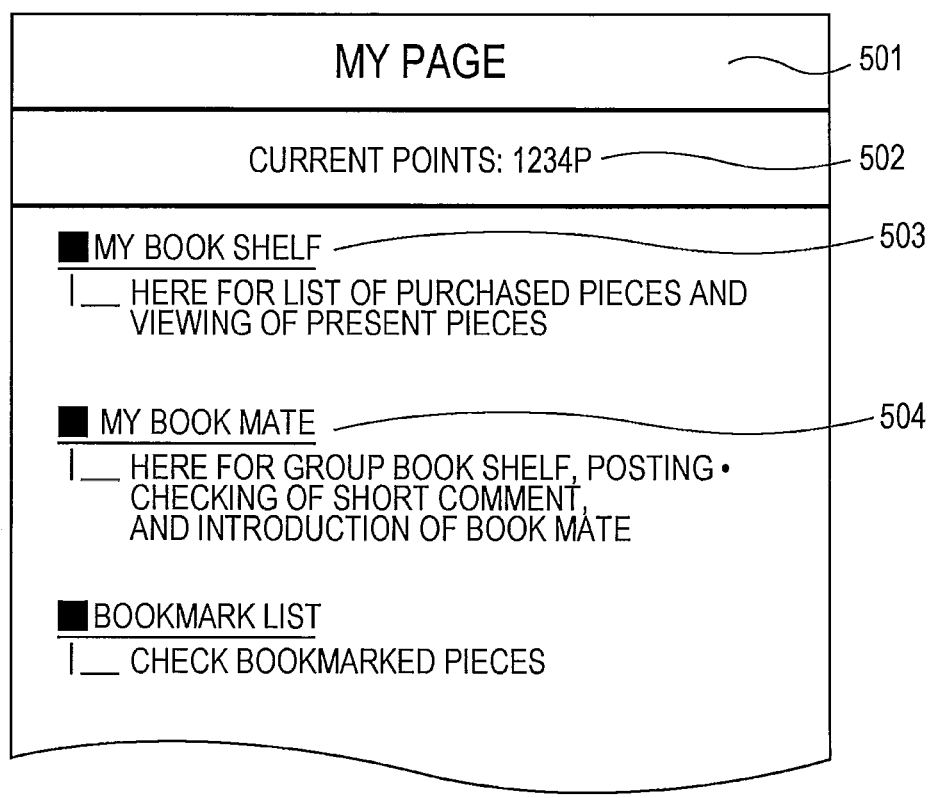
FIG. 9 illustrates an example of a menu page screen for the sharing service in a case where the present invention is applied to the electronic book providing site.

FIG. 9 illustrates an example of a menu page screen when proceeding by clicking the link 403 illustrated in FIG. 8. The menu page includes, following a page title 501, a current point value 502, a link 503 to a "MY book shelf" page, and a link 504 to a "MY book mate" page.

Figure 10:
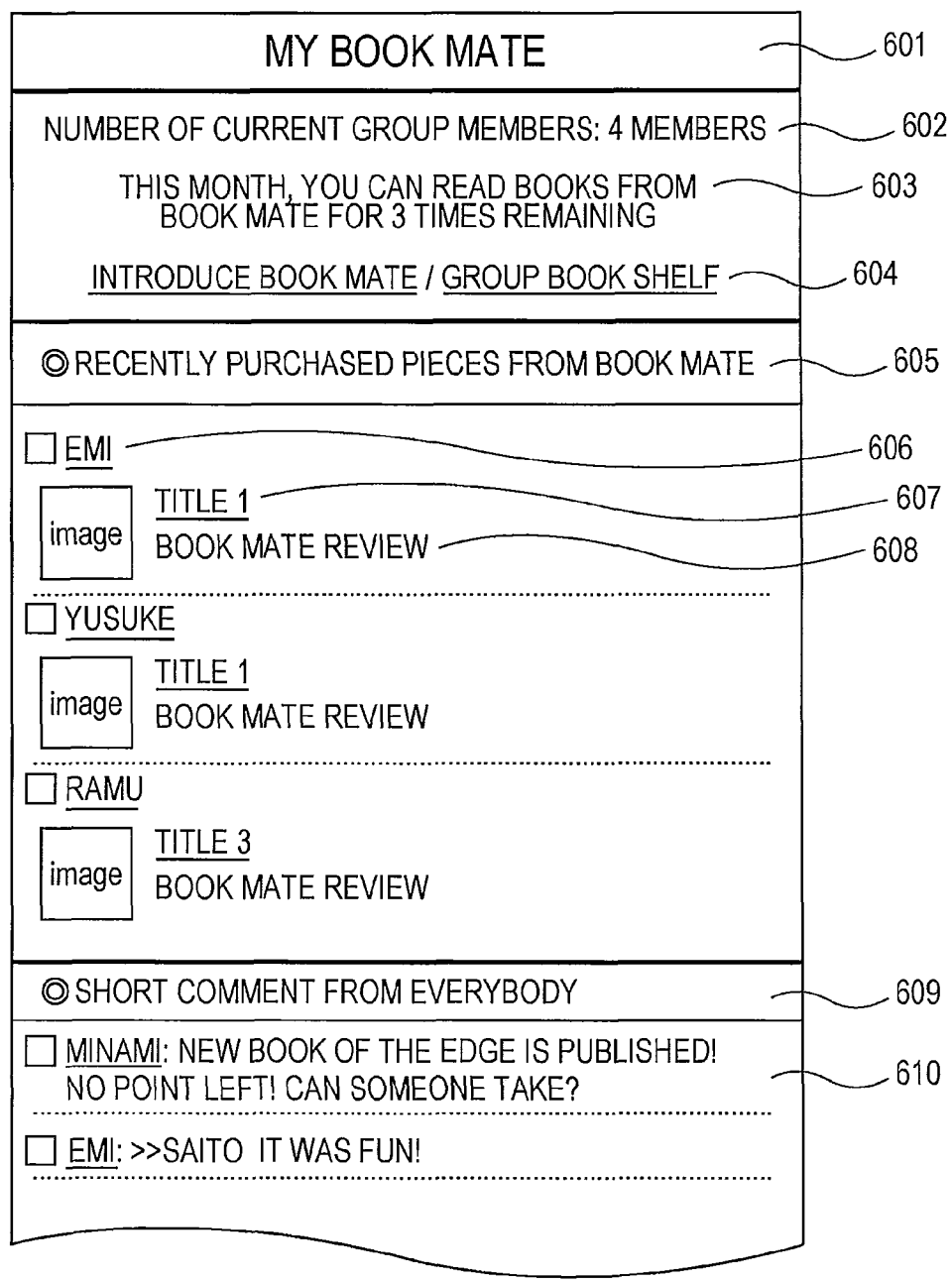
FIG. 10 illustrates an example of a user page screen for the sharing service in a case where the present invention is applied to the electronic book providing site.

FIG. 10 illustrates an example of a user page screen for the sharing service when proceeding by clicking the link 504 to the "MY book mate" page illustrated in FIG. 9. The user page includes, following a page title 601, a description 602 representing the current number of group people, a description 603 representing the remaining utilization upper limit conduct number, and a link 604 to a "group book shelf" page illustrated in FIG. 11. Furthermore, the user page screen is composed of a display part 605 showing meta information on a content where the secondary download can be performed (to be more specific, a purchaser of an electronic book 606, a title 607, and a review description 608 of the purchaser) and a display part 609 composed of comments 610 of mutual members in the group.

Figure 11:
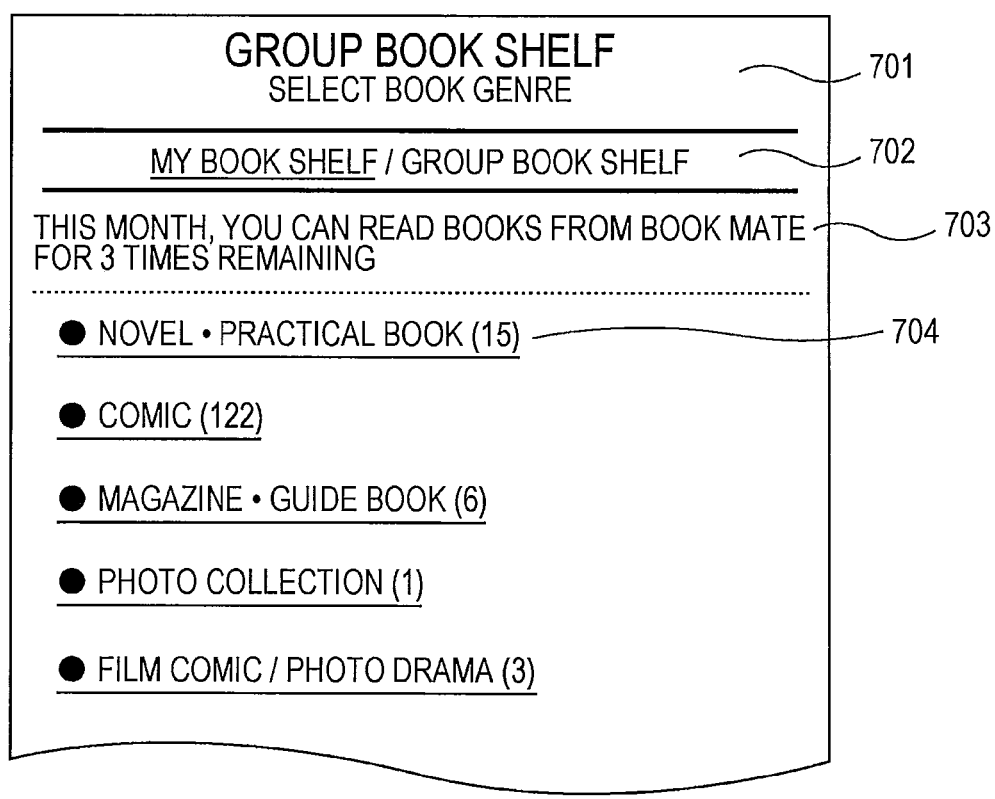
FIG. 11 illustrates an example of a main menu page screen for an inner-group sharing book shelf in the sharing service in a case where the present invention is applied to the electronic book providing site.

FIG. 11 illustrates an example of a menu page screen for an inner-group sharing book shelf when proceeding by clicking the link 604 to the "group book shelf" page illustrated in FIG. 10. The above-mentioned menu page includes, following a page title 701, a link 702 to a "MY book shelf" page illustrated in FIG. 13, a description 703 representing the remaining utilization upper limit conduct number, and a link 704 to a genre list view page.

Figure 12:
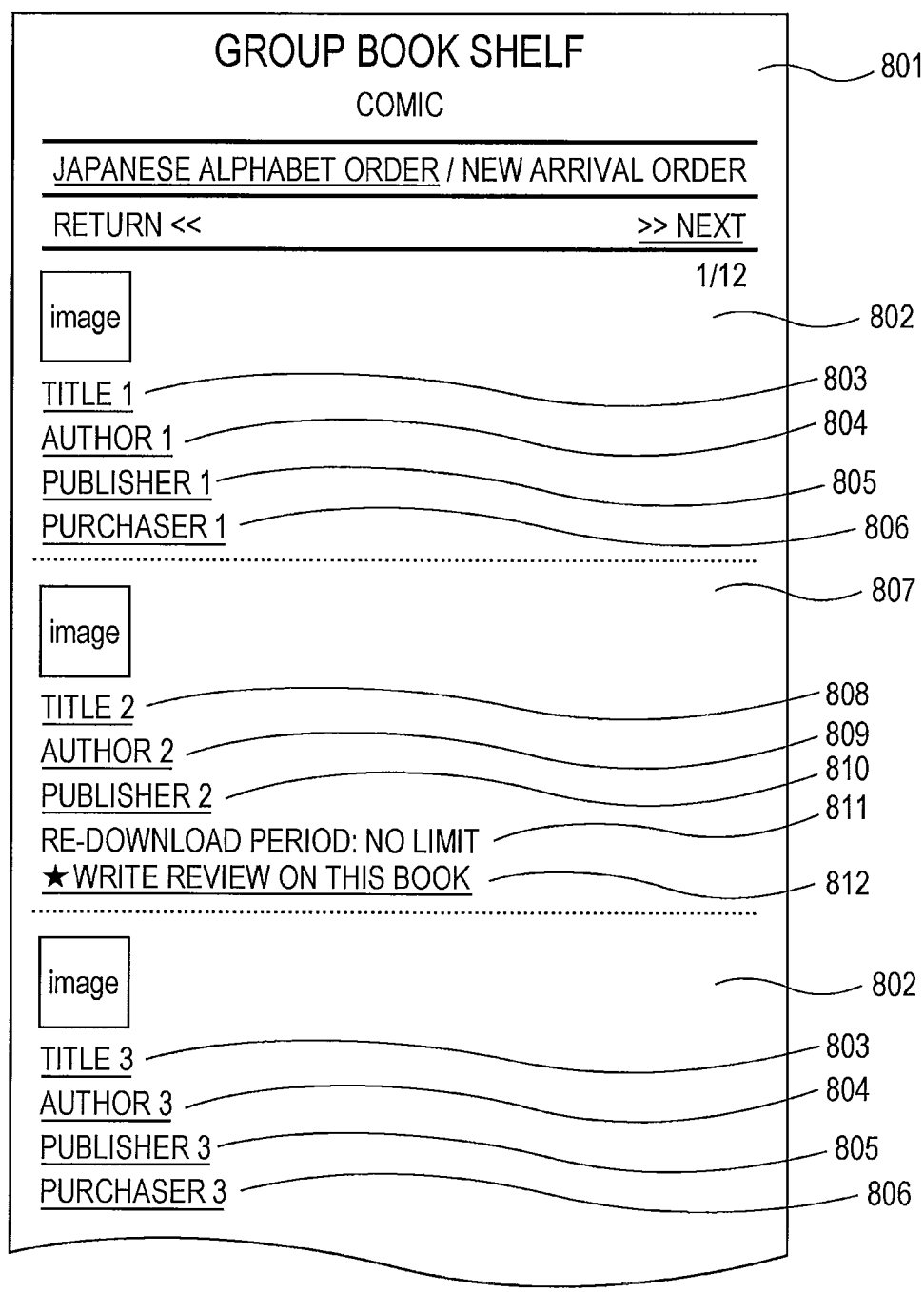
FIG. 12 illustrates an example of a book list page screen for the inner-group sharing book shelf in the sharing service in a case where the present invention is applied to the electronic book providing site.

FIG. 12 illustrates an example of a book list page screen for the inner-group sharing book shelf when proceeding by clicking a link to a "comic" list page among the link 704 to the genre list view page illustrated in FIG. 11. A book list page of the shared book shelf is composed of a page title 801, a display part 802 showing meta information on a content where the secondary download can be performed (to be more specific, a title of an electronic book 803, an author 804, a publisher 805, and a purchaser 806), and a display part 807 showing meta information on a primarily downloaded content (to be more specific, a title of an electronic book 808, an author 809, and a publisher 810). Furthermore, only in the display part 807 related to the primarily downloaded content, a display 811 of a re-download period of a content and a link 812 to a review entry page of the publisher on the above-mentioned content are included.

Figure 13:
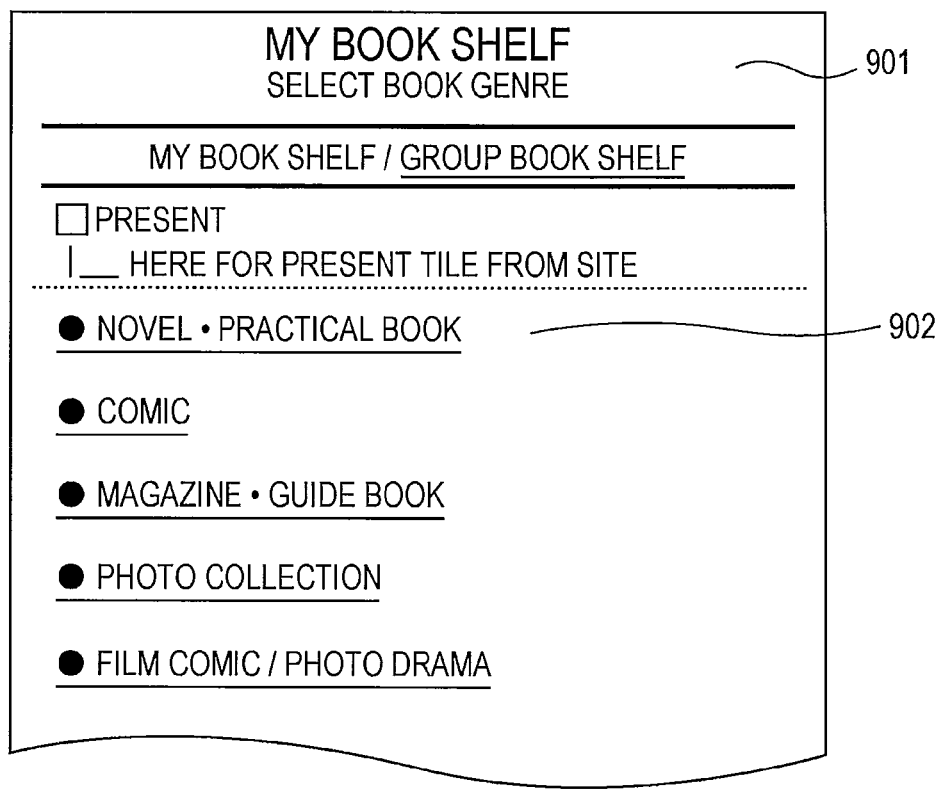
FIG. 13 illustrates example of a menu page screen for on individual book shelf in the sharing service in a case where the present invention is applied to the electronic book providing site.

FIG. 13 illustrates an example of a menu page screen for an individual book shelf when proceeding by clicking the link 702 to the "MY book shelf" page illustrated in FIG. 11. The above-mentioned menu page includes a page title 901 and a link 902 to a genre list view page.

Figure 14:
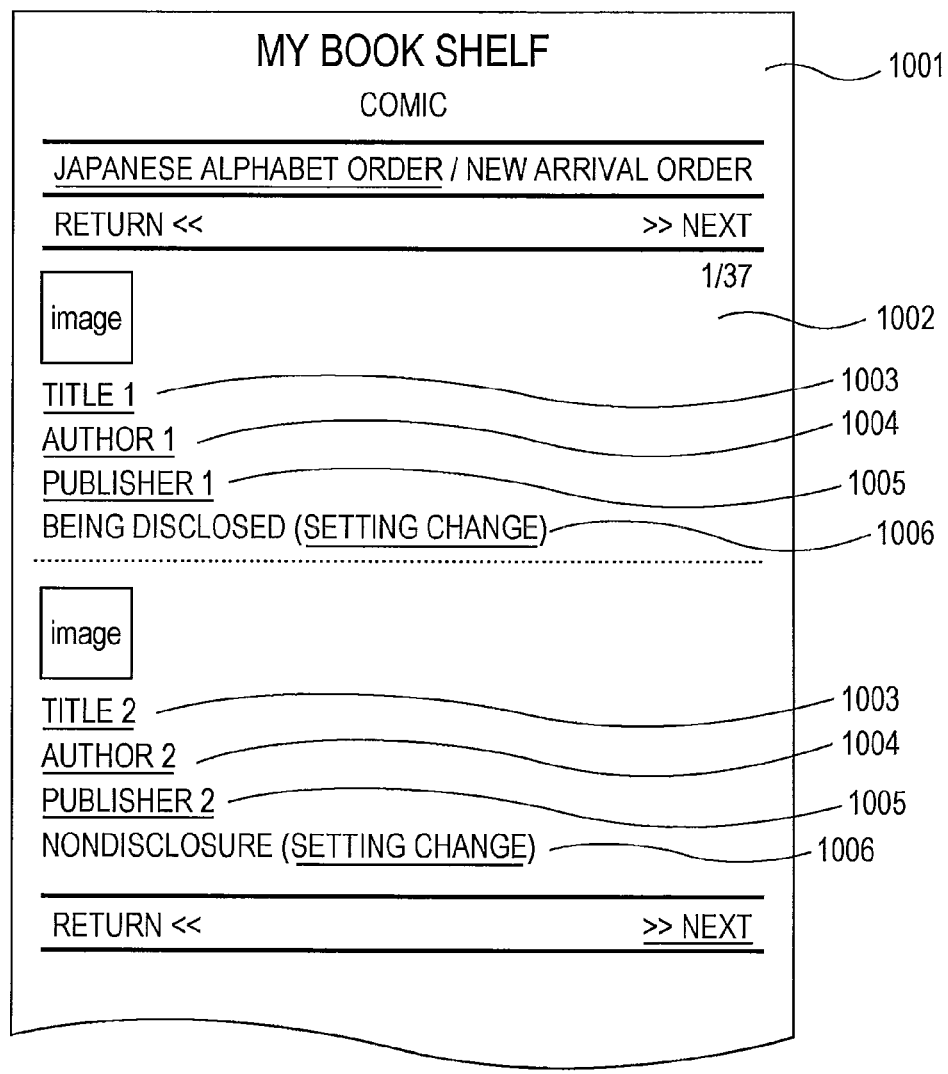
FIG. 14 illustrates an example of a book list page screen for the individual book shelf in the sharing service in a case where the present invention is applied to the electronic book providing site.

FIG. 14 illustrates an example of a book list page screen for the individual book shelf when proceeding by clicking a link to a "comic" list page among the link 902 to the genre list view page illustrated in FIG. 13. A book list page of the individual book shelf is composed of a page title 1001 and a display part 1002 showing meta information on the content primarily downloaded by oneself (to be more specific, a title of an electronic book 1003, an author 1004, and a publisher 1005). Furthermore, the display part 1001 related to the primarily downloaded content particularly includes a link 1006 to a book disclosure/nondisclosure setting change page.

Figure 15:
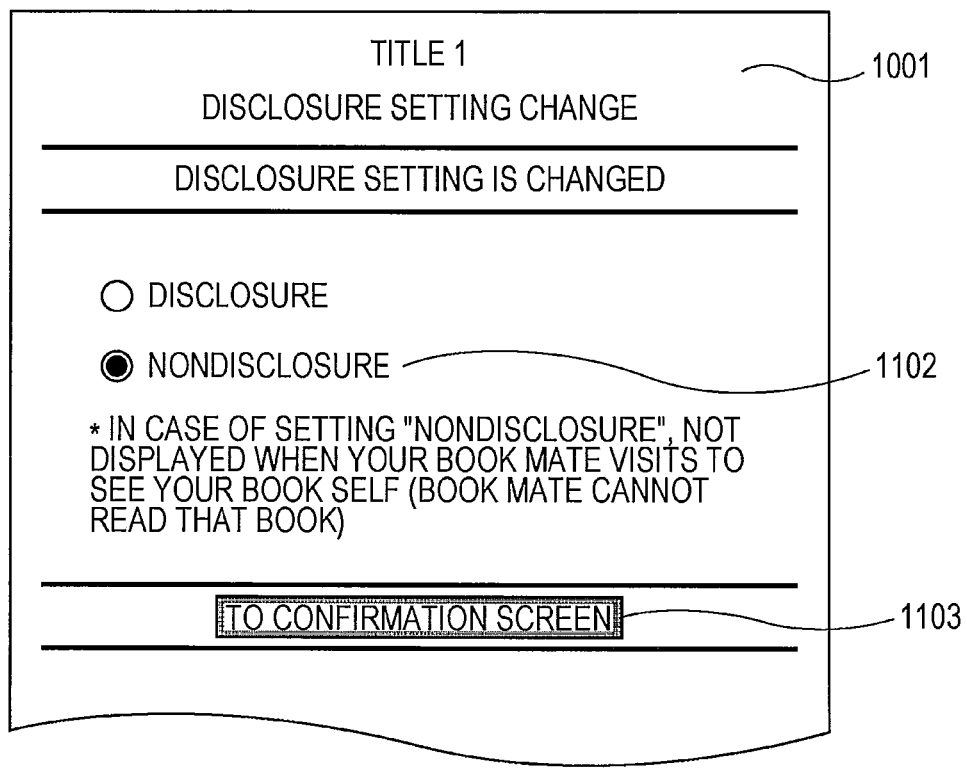
FIG. 15 illustrates an example of a book disclosure/non-disclosure setting change page screen for the individual book shelf in the sharing service in a case where the present invention is applied to the electronic book providing site.

FIG. 15 illustrates an example of a book disclosure/nondisclosure setting change page screen for the individual book shelf when proceeding by clicking the link 1006 to the page for changing the setting on the disclosure/nondisclosure of the content illustrated in FIG. 14. The book disclosure/nondisclosure setting change page is composed of a page title 1101, a button 1102 for setting one of disclosure/nondisclosure, and a confirmation button 1103.

This setting information on the disclosure/nondisclosure is stored as sharing instruction information for instructing whether or not the content primarily downloaded by the user him/herself is shared with another user in the group in the DL file DB 119 and referred to by the file sharing determination unit 114 in the determination step in step S107 in FIG. 3.

According to the above-mentioned embodiment, the member determination unit 111 performs the member determination, but in a case where the reference to the carrier or the external site can be performed, the processing by the member determination unit 111 may be partially omitted.

Also, in a case where the user belongs to a plurality of groups, the book disclosure/nondisclosure setting change can be performed for each group. In this manner, for example, a certain content can be shared only in the group A01, and another content can be shared only in the group A02.

Incidentally, according to the above-mentioned embodiment, the user belonging to the group can share the content primarily downloaded by the user him/herself with another user belonging to the group. Also, in a case where the user belongs to a plurality of groups, it is possible to share with other users belonging to separate groups. However, in principle, the user belonging to the particular group (hereinafter which may be referred to as "group user") is restricted from sharing a certain particular content with a user who does not belong to the particular group (hereinafter which may be referred to as "out-of-group user") or reversely, the out-of-group user from sharing a certain particular content with the group user. Furthermore, the group user and the out-of-group user are restricted from freely sharing the content primarily downloaded by the user with anyone beyond the restriction of the group, for example, in an extremely limited certain period.

In view of the above, according to another embodiment of the present invention which will be described below, as a configuration of removing such a restriction in a case where a certain condition is satisfied is added to a content sharing system 2, an entitlement of the secondary download of a certain particular content or an entitlement of the secondary download of an arbitrary primarily downloaded content can be assigned from the group user to the out-of-group user or from the out-of-group user to the group user.

Figure 16:
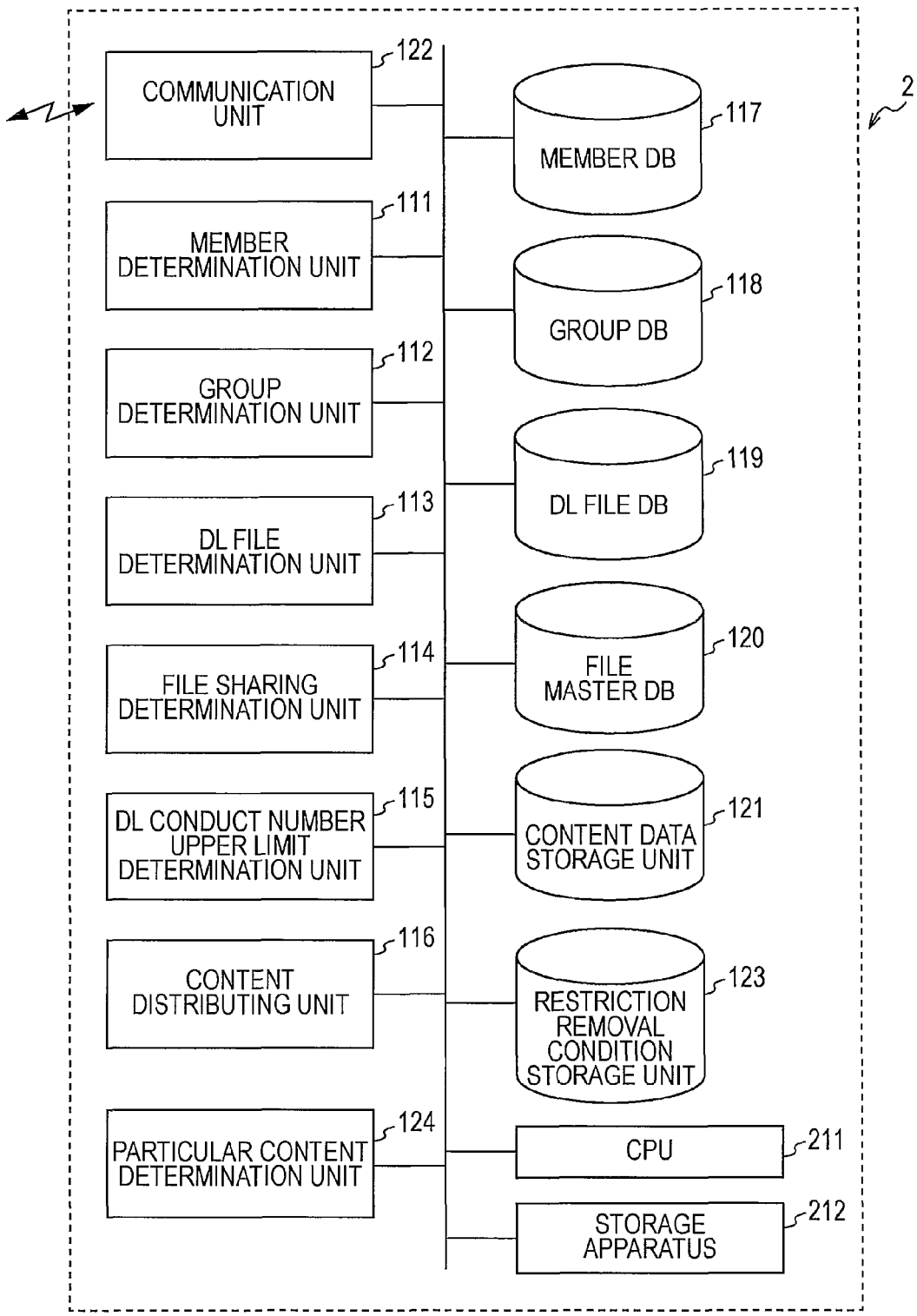
FIG. 16 is a block diagram illustrating a functional configuration of a content sharing system 2 according to another embodiment of the present invention.

FIG. 16 is a block diagram illustrating a functional configuration of the content sharing system 2 according to another embodiment of the present invention. A main difference between the content sharing system 2 and the content sharing system 1 illustrated in FIG. 2 is that the content sharing system 2 is further provided with a restriction removal condition storage unit 123 and a particular content determination unit 124.

According to this another embodiment, as exemplified in FIG. 17, the restriction removal condition storage unit 123 stores information related to three types of first to third restriction removal conditions. According to this another embodiment, the restriction removal condition includes a condition for the primarily downloaded content, a condition for the user performing the primary download, a secondary download entitled user, and a secondary download entitled period.

The first restriction removal condition is set so that the primary downloaded particular content is a content with the secondary download entitlement, the user performing the primary download is a group user primarily downloading the particular content, and the secondary download entitled user is an out-of-group user, and then, the secondary download entitled period is a relatively long period of time (three months). Also, the second restriction removal condition is set so that the primary downloaded particular content is a content with the secondary download entitlement, the user performing the primary download is an out-of-group user primarily downloading the particular content, the secondary download entitled user is a group user, and then, the secondary download entitled period is a relatively long period of time (three months).

Herein, the content with the secondary download entitlement is specifically a particular content where the group user sharing the particular content is associated with the out-of-group user as the out-of-group user (or the group user in case of the second restriction removal condition) who desires to secondarily download the particular content is selected through an operation of the user terminal when or after the particular content is selected and primarily downloaded by the group user (or the out-of-group user in case of the second restriction removal condition) via the user terminals. The conduction of such association means, for example, that the group user (or the out-of-group user in case of the second restriction removal condition) who has primarily downloaded the particular content by paying a special cost that can be referred to "pass" or "ticket" as a common name (that is, who performs the download accompanied by the payment of the cost) can assign an entitlement of the secondary download of particular content to the specifically selected out-of-group user (or the group user in case of the second restriction removal condition).

For this purpose, the particular content determination unit 124 determines whether the group user (or out-of-group user in case of the second restriction removal condition) selects the particular content via the user terminal to perform the primary download. Then, in response to such primary download of the particular content, the particular content determination unit 124 stores the group user identification information (UID) and the out-of-group user identification information (UID) in the DL file DB 119 while being associated with each other when or after a primary download history of the particular content is stored in the DL file DB 119.

Then, the file sharing determination unit 114 determines whether the access by the out-of-group user (or the group user in case of the second restriction removal condition) is within the secondary download entitled period (according to this another embodiment, within three months including the month when the primary download has been performed). Then, in a case of being within the secondary download entitled period, the secondary download of the particular content by the out-of-group user (or the group user in case of the second restriction removal condition) is permitted.

Next, the third restriction removal condition is set so that the user performing the primary download is a particular user in which the primary download conduct number within a predetermined period (for example, a month or 15 days) is larger than or equal to a predetermined conduct number (for example, larger than or equal to five times), the secondary download entitled user is a group user or an out-of-group user, and then, the secondary download entitled period is an extremely short period (one hour). Such setting means that the user whose utilization frequency of the contents by the primary download is high (irrespective of the group user or the out-of-group user) further pays another cost that can be referred to, for example, as "free pass" or "free ticket" as a common name can assign an entitlement of the secondary download of the primarily downloaded content during an extremely limited period to an arbitrary user in a group which is not particularly limited. Via the communication network 13, by executing so-called "friend invitation" action, the user performing the primary download can invite an arbitrary user to be a secondary entitled user.

The file sharing determination unit 114 refers to the DL file DB 119 and determines whether the number for the user to perform the primary download within the predetermined period is larger than or equal to a predetermined conduct number. It determines whether an access by an arbitrary user is within the secondary download entitled period (according to this another embodiment, within one hour from the conduct of the primary download). Then, in the case of being within the secondary download entitled period, with regard to the primarily downloaded content, the user permits the secondary download by the arbitrary user.

While following the above-mentioned another embodiment, meta data on the particular content where the secondary download is permitted or an arbitrary content where the secondary download is permitted (to be more specific, a purchaser of on electronic book, a title, a review description from a publisher) is displayed on the user page screen of the sharing service of the accessing user similarly, for example, as in the example of the user page screen of the sharing service illustrated in FIG. 10.

It should be noted that according to the above-mentioned another embodiment, the information related to the first to third restriction removal conditions stored is the restriction removal condition storage unit 123 and the set specific restriction removal conditions are merely exemplifications and are not limited to these. Also, the special cost that can be referred to as "pass" or "ticket" or another special cost that can be referred to as "free pass" or "free ticket" may be what the user pays as a premium for the service usage fee, the content purchase unit price, points having a convertibility to the above-mentioned usage fee or purchase unit price, and the like or what is compensated and exchanged with a point or a coupon that is acquired by the primary download of the limited content.

In the above, the exemplifications are illustrated according to the plurality of embodiments while citing the drawings, but the present inventions not limited to these, and changes can be made appropriately within a scope without impairing the gist of the present invention.

Industrial Applicability

The present invention is to accelerate the circulation and utilization of the electronic books through the electronic book site and other content distributing sites and significantly contributes to the activation of the electronic book market with the large contribution to the industrial progress.

The invention claimed is:

1. A content sharing system for managing, by controlling distribution of contents toward user terminals from a content distributing apparatus for groups each composed of a plurality of users, sharing of the respective contents in the group, the content sharing system comprising:

a content distributing unit that distributes content data to a user terminal in accordance with a download request from the respective user terminals connected to the content distributing apparatus via a communication network;

a storage unit that stores a download history of a content via the user terminal by the respective users while associating the download history with user identification information and also stores identification of each of one or more groups to which the respective users belong while associating the identification of the groups with the user identification information;

a group determination unit that determines a group to which a user accessing via the user terminal belongs;

a sharing control unit that determines whether a content that was already firstly downloaded by another user belonging to the determined group, the first download being accompanied by a payment of a cost, exists on the basis of the download history, and permits secondary download of the content firstly downloaded by the another user to the accessing user terminal, upon existence of the content firstly downloaded by the another user accompanied by the payment of the cost, the secondary download not being accompanied by a payment of a cost by the user; and a particular content determination unit that determines whether an in-group user belonging to a particular group selects a particular content and performs download accompanied by a payment of a cost;

wherein the storage unit further stores information related to a first restriction removal condition applying to a ease where an out-of-group user who does not belong to the particular group is permitted to perform secondary download via the user terminal of the particular content downloaded by the in-group user accompanied by the payment of the cost and stores, in response to the download of the particular content by the in-group user accompanied by the payment of the cost, identification information on the in-group user while associating the identification information on the in-group user with identification information on the out-of-group user; and wherein the sharing control unit further determines whether or not the first restriction removal condition is satisfied in accordance with an access by the out-of-group user, and permits secondary download to the accessing user terminal of the out-of-group user with regard to the particular content downloaded by the in-group user accompanied by the payment of the cost, upon the condition being satisfied.

2. A content sharing system for managing, by controlling distribution of contents toward user terminals from a content distributing apparatus for groups each composed of a plurality of users, sharing of the respective contents in the group, the content sharing system comprising:

a content distributing unit that distributes content data to is user terminal in accordance with a download request from the respective user terminals connected to the content distributing apparatus via a communication network;

a storage unit that stores a download history of a content via the user terminal by the respective users while associating the download history with user identification information and also stores identification of each of one or more groups to which the respective users belong while associating the identification of the groups with the user identification information;

a group determination unit that determines a group to which a user accessing via the user terminal belongs;

a sharing control unit that determines whether a content that was already firstly downloaded by another user belonging to the determined group, the first download being accompanied by a payment of a cost, exists on the basis of the download history, and permits secondary download of the content firstly downloaded by the another user to the accessing user terminal, upon existence of the primarily content firstly downloaded by the another user accompanied by the accompanied by the payment of the cost, the secondary download not being accompanied by a payment of a cost by the user; and a particular content determination unit that determines whether an out of group user who does not belong to a particular group selects a particular content and performs download accompanied by a payment of a cost;

wherein the storage Unit further stores information related to a second restriction removal condition applying to a case where an in-group user belonging to the particular group is permitted to perform secondary download via the user terminal of the particular content downloaded by the out-of-group user accompanied by the payment of the cost and stores, in response to the download of the particular content by the out-of-group user accompanied by the payment of the cost, identification information on the out-of-group user while associating the identification information on the out-of-group user with identification information on the in-group user; and wherein the sharing control unit further determines whether or not the second restriction removal condition is satisfied in accordance with an access by the in-group user, and permits secondary download to the accessing user terminal of the in-group user with regard to the particular content downloaded by the out-of-group user accompanied by the payment of the cost, upon the condition being satisfied.

3. A content sharing system for managing, by controlling distribution of contents toward user terminals from a content distributing apparatus for groups each composed of a plurality of users, sharing of the respective contents in the group, the content sharing system comprising:

a content distributing unit that distributes content data to a user terminal in accordance with a download request from the respective user terminals connected to the content distributing apparatus via a communication network;

a storage unit that stores a download history of a content via the user terminal by the respective users while associating the download history with user identification information and also stores identification of each of one or more groups to which the respective users belong while associating the identification of the groups with the user identification information;

a group determination unit that determines a group to which a user accessing via the user terminal belongs; and a sharing control unit that determines whether a content that was already firstly downloaded by another user belonging to the determined group, the first download being accompanied by a payment of a cost, exists on the basis of the download history, and permits secondary download of the content firstly downloaded by the another user to the accessing user terminal, upon existence of the content firstly downloaded by the another user accompanied by the payment of the cost, the secondary download not being accompanied by a payment of a cost by the user;

wherein the storage unit further stores information related to a third restriction removal condition applying to a case where an in-group user belonging to a particular group or an out-of-group user who does not belong to the particular group is permitted to perform secondary download via the user terminal of a content downloaded by a particular user accompanied by a payment of a cost; and wherein the sharing control unit further determines whether or not the third restriction removal condition is satisfied in accordance with an access by the in-group user or the out-of-group user, and permits secondary download to the accessing user terminal of the in-group user or the out-of-group user with regard to the particular content downloaded by the particular user accompanied by the payment of the cost, upon the condition being satisfied.

4. The content sharing system according to claim 1, wherein:

the storage unit further stores sharing instruction information instructing whether or not a content downloaded by a user him/herself accompanied by a payment of as cost is shared with another user in the group; and wherein the sharing control unit permits or forbids secondary download of the content downloaded by the another user accompanied by the payment of the cost to the accessing user terminal on the basis of the sharing instruction information, the secondary download not being accompanied by a payment of as cost by the user.

5. The content sharing system according to claim 1, wherein:

the storage unit further stores upper limit instruction information instructing an upper limit conduct number in a predetermined period with regard to the number of secondary download availabilities for the content downloaded by the another user accompanied by the payment of the cost;

wherein the download history further includes a secondary download conduct number in the predetermined period, associated with the user;

wherein the content sharing system further comprises a utilization upper limit determination unit that determines whether the number of secondary download within the predetermined period is smaller than the upper limit conduct number on the basis of the upper limit instruction information and the download history; and wherein the sharing control unit permits the secondary download to the accessing user terminal, upon the secondary download conduct number in the predetermined period being smaller than the upper limit conduct number.

6. The content sharing system according to claim 1, wherein:

the content distributing unit generates display data which is composed of a. first display part showing meta data on a content already downloaded accompanied by the payment of the cost and/or a second display part showing meta data on a content where secondary download can be performed, and which is transmitted to the user terminal.

7. A content sharing method of managing, by controlling distribution of contents toward user terminals from a content distributing apparatus for groups each composed of a plurality of users, sharing of the respective contents in the group, the content sharing method comprising the steps of:

storing a download history of a content via a user terminal by the respective users while associating the download history with user identification information;

storing identification information on each of one or more groups to which the respective users belong while associating the identification information on the groups with the user identification information;

determining a group to which a user accessing via the user terminal connected to the content distributing apparatus via a communication network belongs;

determining whether a content that was already firstly downloaded by another user belonging to the determined group, the first download being accompanied by a payment of a cost, exists on the basis of the download history;

permitting secondary download of the content firstly downloaded by the another user to the accessing user terminal, upon existence of the content firstly downloaded by the another user accompanied by the payment of the cost, the secondary download not being accompanied by a payment of a cost by the user;

distributing content data on the content where the secondary download is permitted to the user terminal in accordance with as download request from the user terminal;

determining whether an in-group user belonging to a particular group selects a particular content and performs download accompanied by a payment of a cost;

storing information related to a first restriction removal condition applying to a case where an out-of-group user who does not belong to the particular group is permitted to perform secondary download via the user terminal of the particular content downloaded by the in-group user accompanied by the payment of the cost;

storing, in response to the download of the particular content by the in-group user accompanied by the payment of the cost, identification information on the in-group user while associating the identification information on the in-group user with identification information on the out-of-group user; and determining whether or not the first restriction removal condition is satisfied in accordance with an access by the out-of-group user, and permitting secondary download to the accessing user terminal of the out-of-group user with regard to the particular content downloaded by the in-group user accompanied by the payment of the cost, upon the condition being satisfied.

8. A content sharing method of managing, by controlling distribution of contents toward user terminals from a content distributing apparatus for groups each composed of a plurality of users, sharing of the respective contents in the group, the content sharing method comprising the steps of:

storing a download history of a content via a user terminal by the respective users while associating the download history with user identification information;

storing identification information on each of one or more groups to which the respective users belong while associating the identification information on the groups with the user identification information;

determining a group to which a user accessing via the user terminal connected to the content distributing apparatus via a communication network belongs;

determining whether a content that was already firstly downloaded by another user belonging to the determined group, the first download being accompanied by a payment of a cost, exists on the basis of the download history;

permitting secondary download of the content firstly downloaded by the another user to the accessing user terminal, upon existence of the content firstly downloaded by the another user accompanied by the payment of the cost, the secondary download not being accompanied by a payment of a cost by the user;

distributing content data on the content where the secondary download is permitted to the user terminal in accordance with a download request from the user terminal;

determining whether an out-of-group user who does not belong to a particular group selects a particular content and performs download accompanied by a payment of a cost;

storing information related to a second restriction removal condition applying to a case where an in-group user belonging to the particular group is permitted to perform secondary download via the user terminal of the particular content downloaded by the out-of-group user accompanied by the payment of the cost;

storing, in response to the download of the particular content by the out-of-group user accompanied by the payment of the cost, identification information on the out-of-group user while associating the identification information on the out-of-group user with identification information on the in group user; and determining whether or not the second restriction removal condition is satisfied in accordance with an access by the in-group user, and permitting secondary download to the user terminal of the accessing in-group user with regard to the particular content downloaded by the out-of-group user accompanied by the payment of the cost, upon the condition being satisfied.

9. A content sharing method of managing, by controlling distribution of contents toward user terminals from a content distributing apparatus for groups each composed of a plurality of users, sharing of the respective contents in the group, the content sharing method comprising the steps of:

storing a download history of a content via a user terminal by the respective users while associating the download history with user identification information;

storing identification information on each of one or wore groups to which the respective users belong while associating the identification information on the groups with the user identification information;

determining a group to which a user accessing via the user terminal connected to the content distributing apparatus via a communication network belongs;

determining whether a content that was already firstly downloaded by another user belonging to the determined group, the first download being accompanied by a payment of a cost, exists on the basis of the download history;

permitting secondary download of the content firstly downloaded by the another user to the accessing user terminal, upon existence of the content firstly downloaded by the another user accompanied by the payment of the cost, the secondary download not being accompanied by a payment of a cost by the user;

distributing content data on the content where the secondary download is permitted to the user terminal in accordance with a download request from the user terminal;

storing information related to a third restriction removal condition applying to a ease where an in-group user belonging to a particular group or an out-of-group user who does not belong to the particular group is permitted to perform secondary download via the user terminal of a content downloaded by a particular user accompanied by a payment of a cost; and determining whether or not the third restriction removal condition is satisfied in accordance with an access by the in-group user or the out-of-group user and if the condition is satisfied, with regard to the particular content downloaded by the particular user accompanied by the payment of the cost, permitting secondary download to the user terminal of the accessing in-group user or the out-of-group user.

10. The content sharing method according to claim 7 further comprising the steps of:

storing sharing instruction information instructing whether or not a content downloaded by a user him/herself accompanied by a payment of a cost is shared with another user in the group; and permitting or forbidding secondary download of the content downloaded by the another user accompanied by the payment of the cost to the accessing user terminal on the basis of the sharing instruction information, the secondary download not being accompanied by a payment of a cost by the user.

11. The content sharing method according to claim 7 further comprising the steps of:

storing upper limit instruction information instructing an upper limit conduct number in a predetermined period with regard to the number of secondary download availabilities for the content already downloaded by the another user accompanied by the payment of the cost;

storing a secondary download conduct number in the predetermined period associated with the user to be included in the download history;

determining, whether the number of secondary download within the predetermined period is smaller than the upper limit conduct number on the basis of the upper limit instruction information and the download history; and permitting the secondary download to the accessing user terminal upon the secondary download conduct number in the predetermined period being smaller than the upper limit conduct number.

12. The content sharing method according to claim 7 further comprising the step of:

generating display data which is composed of a first display part showing meta data on a content already downloaded accompanied by the payment of the cost and/or a second display part showing meta data on a content where secondary download can be performed and transmitting the display data to the user terminal.

13. A non-transitory computer-readable storage medium storing a program for instructing a computer to execute a content sharing method of managing, by controlling distribution of contents toward user terminals from a content distributing apparatus for groups each composed of as plurality of users, sharing of the respective contents in the group, the method comprising, the steps of:

storing a download history of a content via a user terminal by the respective users while associating the download history with user identification information;

storing identification information on each of one or more groups to which the respective users belong while associating the identification information on the groups with the user identification information;

determining a group to which a user accessing via the user terminal connected to the content distributing apparatus via a communication network belongs;

determining whether a content that was already firstly downloaded by another user belonging to the determined group, the first download being accompanied by a payment of a cost, exists on the basis of the download history;

permitting secondary download of the content firstly downloaded by the another user to the user terminal accessing the content, upon existence of the content firstly downloaded by the another user accompanied by the payment of the cost, the secondary download not being accompanied by a payment of a cost by the user;

distributing content data on the content where the secondary download is permitted to the user terminal in accordance with a download request from the user terminal;

determining whether an in-group user belonging to a particular group selects a particular content and performs download accompanied by a payment of a cost;

storing information related to a first restriction removal condition applying to a case where an out of-group user who does not belong to the particular group is permitted to perform secondary download via the user terminal of the particular content downloaded by the in-group user accompanied by the payment of the cost;

storing, in response to the download of the particular content by the in-group user accompanied by the payment of the cost, identification information on the in-group user while associating the identification information on the in-group user with identification information on the out-of-group user; and determining whether or not the first restriction removal condition is satisfied in accordance with an access by the out-of-group user, and permitting secondary download to the accessing user terminal of the out-of-group user with regard to the particular content downloaded by the in-group user accompanied by the payment of the cost, upon the condition being satisfied.

14. A non-transitory computer-readable storage medium storing a program for instructing a computer to execute a content sharing method of managing, by controlling distribution of contents toward user terminals from a content distributing apparatus for groups each composed of a plurality of users, sharing of the respective contents in the group, the method comprising the steps of:

storing a download history of a content via a user terminal by the respective users while associating the download history with user identification information;

storing identification information on each of one or more groups to which the respective users belong while associating the identification information on the group s with the user identification information;

determining a group to which a user accessing via the user terminal connected to the content distributing apparatus via a communication network belongs;

determining whether a content that was already firstly downloaded by another user belonging to the determined group, the first download being accompanied by a payment of a cost, exists on the basis of the download history;

permitting secondary download of the content firstly downloaded by the another user to the user terminal accessing the content, upon existence of the content firstly downloaded by the another user accompanied by the payment of the cost, the secondary download not being accompanied by a payment of a cost by the user;

distributing content data on the content where the secondary download is permitted to the user terminal in accordance with a download request from the user terminal;

determining whether an out-of-group user who does not belong, to a particular group selects a particular content and performs download accompanied by a payment of a cost;

storing information related to a second restriction removal condition applying to a case where an in-group user belonging to the particular group is permitted to perform secondary download via the user terminal of the particular content downloaded by the out-of-group user accompanied by the payment of the cost;

storing, in response to the download of the particular content by the out-of-group user accompanied by the payment of the cost, identification information on the out-of-group user while associating the identification information on the out-of-group user with identification information on the in-group user; and determining whether or not the second restriction removal condition is satisfied in accordance with an access by the in-group user, and permitting secondary download to the user terminal of the accessing in-group user with regard to the particular content downloaded by the out-of-group user accompanied by the payment of the cost, upon the condition being satisfied.

15. A non-transitory computer-readable storage medium storing a program for instructing a computer to execute a content sharing method of managing, by controlling distribution of contents toward user terminals from a content distributing apparatus for groups each composed of a plurality of users, sharing of the respective contents in the group, the method comprising the steps of:

storing a download history of a content via a user terminal h the respective users while associating the download history with user identification information;

storing identification information on each of one or more groups to which the respective users belong while associating the identification information on the groups with the user identification information;

determining a group to which a user accessing via the user terminal connected to the content distributing apparatus via a communication network belongs;

determining whether a content that was already firstly downloaded by another user belonging to the determined group, the first download being accompanied by a payment of a cost, exists on the basis of the download history;

permitting secondary download of the content firstly downloaded by the another user to the user terminal accessing the content, upon existence of the content firstly downloaded by the another user accompanied by the payment of the cost, the secondary download not being accompanied by a payment of a cost by the user;

distributing content data on the content where the secondary download is permitted to the user terminal in accordance with a download request from the user terminal;

storing information related to a third restriction removal condition applying to a case where an in-group user belonging to as particular group is permitted to perform secondary download via the user terminal of a content downloaded by a particular user accompanied by a payment of a cost; and determining whether or not the third restriction removal condition is satisfied in accordance with an access by the in-group user or the out-of-group user and if the condition is satisfied, with regard to the particular content downloaded by the particular user accompanied by the payment of the cost, permitting secondary download to the user terminal of the accessing in-group user or the out-of-group user.

16. The content sharing system according to claim 2, wherein:

the storage unit further stores sharing instruction information instructing whether or not a content downloaded by a user him/herself accompanied by as payment of as cost is shared with another user in the group; and wherein the sharing control unit permits at forbids secondary download of the content downloaded by the another user accompanied by the payment of the cost to the accessing user terminal on the basis of the sharing instruction information, the secondary download not being accompanied by a payment of a cost by the user.

17. The content sharing N stem according to claim 3, wherein:

the storage unit further stores sharing instruction information instructing whether or not a content downloaded by a user him/herself accompanied by a payment of a cost is shared with another user in the group; and wherein the sharing control unit permits or forbids secondary download of the content downloaded by the another user accompanied by the payment of the cost to the accessing user terminal on the basis of the sharing instruction information, the secondary download not being accompanied by a payment of a cost by the user.

18. The content sharing system according to claim 2, wherein:

the storage unit further stores upper limit instruction information instructing an upper limit conduct number in a predetermined period with regard to the number of secondary download availabilities for the content downloaded by the another user accompanied by the payment of the cost;

wherein the download history further includes a secondary download conduct number in the predetermined period associated with the user;

wherein the content sharing system Further comprises a utilization upper limit determination unit that determines whether the number of secondary download within the predetermined period is smaller than the upper limit conduct number on the basis of the upper limit instruction information and the download history; and wherein the sharing control unit permits the secondary download to the accessing user terminal, upon the secondary download conduct number in the predetermined period being smaller than the upper limit conduct number.

19. The content sharing system according to claim 3, wherein:

the storage unit further stores upper limit instruction information instructing an upper limit conduct number in a predetermined period with regard to the number of secondary download availabilities for the content downloaded by the another user accompanied by the payment of the cost;

wherein the download history further includes a secondary download conduct number in the predetermined period associated with the user;

wherein the content sharing system further comprises a utilization upper limit determination unit that determines whether the number of secondary download within the predetermined period is smaller than the upper limit conduct number on the basis of the upper limit instruction information and the download history; and wherein the sharing control unit permits the secondary download to the accessing user terminal, upon the secondary download conduct number in the predetermined period being smaller than the upper limit conduct number.

20. The content sharing system according to claim 2, wherein:

the content distributing unit generates display data which is composed of a first display part showing meta data on a content already downloaded accompanied by the payment of the cost and/or a second display part showing meta data on a content where secondary download can be performed, and which is transmitted to user terminal.

21. The content sharing system according to claim 3, wherein:

the content distributing unit generates display data which is composed of a first display part showing meta data on a content already downloaded accompanied by the payment of the cost and/or a second display part showing meta data on a content where secondary download can be performed, and which is transmitted to the user terminal.

22. The content Sharing method according to claim 8 further comprising the steps of:

storing sharing instruction information instructing whether or not a content downloaded by a user him/herself accompanied by a payment of a cost is shared with another user in the group; and permitting or forbidding secondary download of the content downloaded by the another user accompanied by the payment of the cost to the accessing user terminal on the basis of the sharing instruction information, the secondary download not being accompanied by a payment of a cost by the user.

23. The content sharing method according to claim 9 further comprising the steps of:

storing sharing instruction information instructing whether or not a content downloaded by a user him/herself accompanied by a payment of a cost is shared with another user in the group; and permitting or forbidding secondary download of the content downloaded by the another user accompanied by the payment of the cost to the accessing user terminal on the basis of the sharing instruction information, the secondary download not being accompanied by a payment of a cost by the user.

24. The content sharing method according to claim 8 further comprising the steps of:

storing upper hunt instruction information instructing an upper hunt conduct number in a predetermined period with regard to the number of secondary download availabilities for the content already downloaded by the another user accompanied by the payment of the cost;

storing a secondary download conduct number in the predetermined period associated with the user to be included in the download history;

determining whether the number of secondary download within the predetermined period is smaller than the upper limit conduct number on the basis of the upper limit instruction information and the download history; and permitting the secondary download to the accessing user terminal upon the secondary download conduct number in the predetermined period being smaller than the upper limit conduct. number.

25. The content sharing method according to claim 9 further comprising the steps of:

storing upper limit instruction information instructing an upper limit conduct number in a predetermined period with regard to the number of secondary download availabilities for the content already downloaded by the another user accompanied by the payment of the cost;

storing, a secondary download conduct number in the predetermined period associated with the user to he included in the download history;

determining whether the number of secondary download within the predetermined period is smaller than the upper limit conduct number on the basis of the upper limit instruction information and the download history; and permitting the secondary download to the accessing user terminal upon the secondary download conduct number in the predetermined period being smaller than the upper limit conduct number.

26. The content sharing method according to claim 8 further comprising the step of:

generating display data which is composed of a first display part showing meta data on a content already downloaded accompanied by the payment of the cost and/or a second display part showing meta data on a content where secondary download can be performed and transmitting the display data to the user terminal.

27. The content sharing method according to claim 9 further comprising the step of:

generating display data which is composed of a first display part showing meta data on a content already downloaded accompanied by the payment of the cost and/or a second display part showing meta data on a content where secondary download can be performed and transmitting the display data to the user terminal.

\* \* \* \* \*